United States Patent [19]

Kaufman et al.

[11] Patent Number: 5,760,781
[45] Date of Patent: Jun. 2, 1998

[54] APPARATUS AND METHOD FOR REAL-TIME VOLUME VISUALIZATION

[75] Inventors: Arie E. Kaufman, Plainview; Hanspeter Pfister, Stony Brook, both of N.Y.

[73] Assignee: The Research Foundation of State University of New York, Melville, N.Y.

[21] Appl. No.: 941,352

[22] Filed: Sep. 30, 1997

Related U.S. Application Data

[63] Continuation of Ser. No. 388,066, Feb. 13, 1995, abandoned, which is a continuation-in-part of Ser. No. 301,205, Sep. 6, 1994, Pat. No. 5,594,842.

[51] Int. Cl.$^6$ ........................................... G06T 15/00
[52] U.S. Cl. ...................... 345/424; 345/502; 345/505
[58] Field of Search ............................. 395/124, 502, 395/505; 345/424, 502, 505

[56] References Cited

U.S. PATENT DOCUMENTS

| | | | |
|---|---|---|---|
| 4,827,413 | 5/1989 | Baldwin et al. | 364/413.19 |
| 4,835,712 | 5/1989 | Drebin et al. | 395/123 |
| 4,984,157 | 1/1991 | Cline et al. | 364/413.13 |
| 4,985,856 | 1/1991 | Kaufman et al. | |
| 5,038,302 | 8/1991 | Kaufman | 395/124 |
| 5,101,475 | 3/1992 | Kaufman et al. | |
| 5,313,567 | 5/1994 | Civanlar et al. | 395/124 |
| 5,317,689 | 5/1994 | Nack et al. | 395/505 |
| 5,594,842 | 1/1997 | Kaufman et al. | 395/124 |

OTHER PUBLICATIONS

Kaufman et al., "A Survey of Architectures for Volume rendering, " IEEE Engineering in Medicine and Biology Magazine, pp. 18–23, Dec. 90.

Foley et al., "Computer Graphics: Principles and Practice, 2nd Edition" pp. 738, 835–842, 914, 1034–1039, 1990.

*Primary Examiner*—Mark K. Zimmerman
*Attorney, Agent, or Firm*—Hoffmann & Baron, LLP

[57] ABSTRACT

A method and apparatus for providing real-time processing of voxels and real-time volume visualization of objects and scenes in a highly parallel and pipelined manner includes a three dimensional (3-D) skewed memory, two dimensional (2-D) skewed buffers, 3-D interpolation and shading of data points, and signal compositing. The method and apparatus implement ray-casting, a powerful volume rendering technique. Viewing rays are cast from the viewing position into a cubic frame buffer and beams of voxels, which are parallel to the face of the cubic frame buffer, are accessed. At evenly spaced sample points along each viewing ray, each sample point is tri-linearly interpolated using values of surrounding voxels. Central differences of voxels around the sample points yield a gradient which is used as a surface normal approximation. Using the gradient and the interpolated sample values, a local shading model is applied and a sample opacity is assigned. Finally, ray samples along the ray are composited into pixel values and provided to a display device to produce an image.

19 Claims, 13 Drawing Sheets

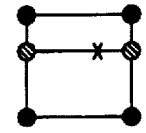
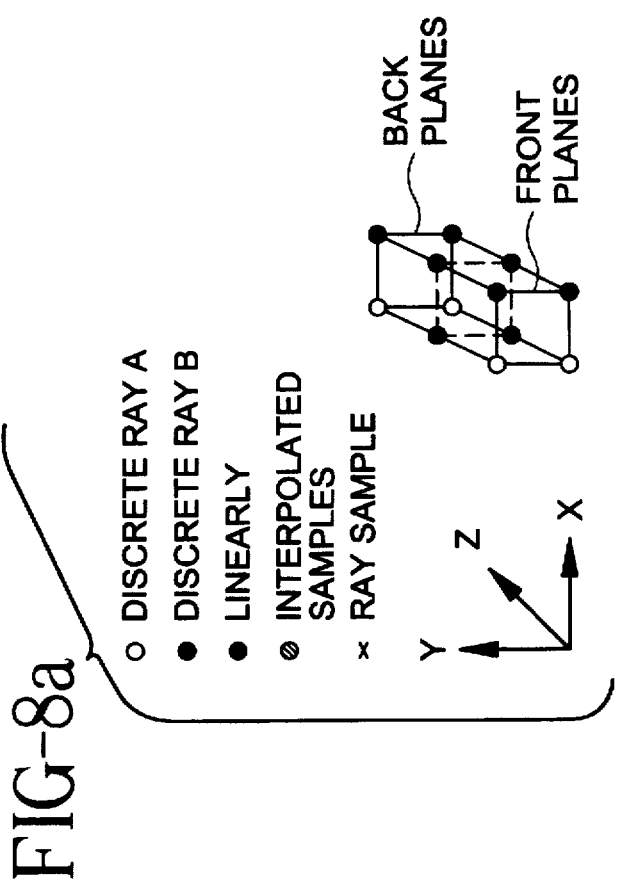
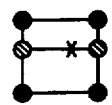
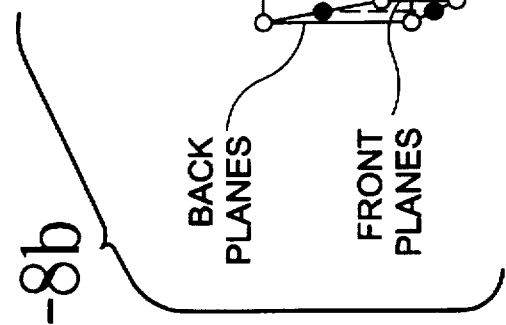
FIG-8a
FIG-8b
FIG-8c
FIG-8d
○ DISCRETE RAY A
● DISCRETE RAY B
● LINEARLY
◉ INTERPOLATED SAMPLES
× RAY SAMPLE
BACK PLANES
FRONT PLANES

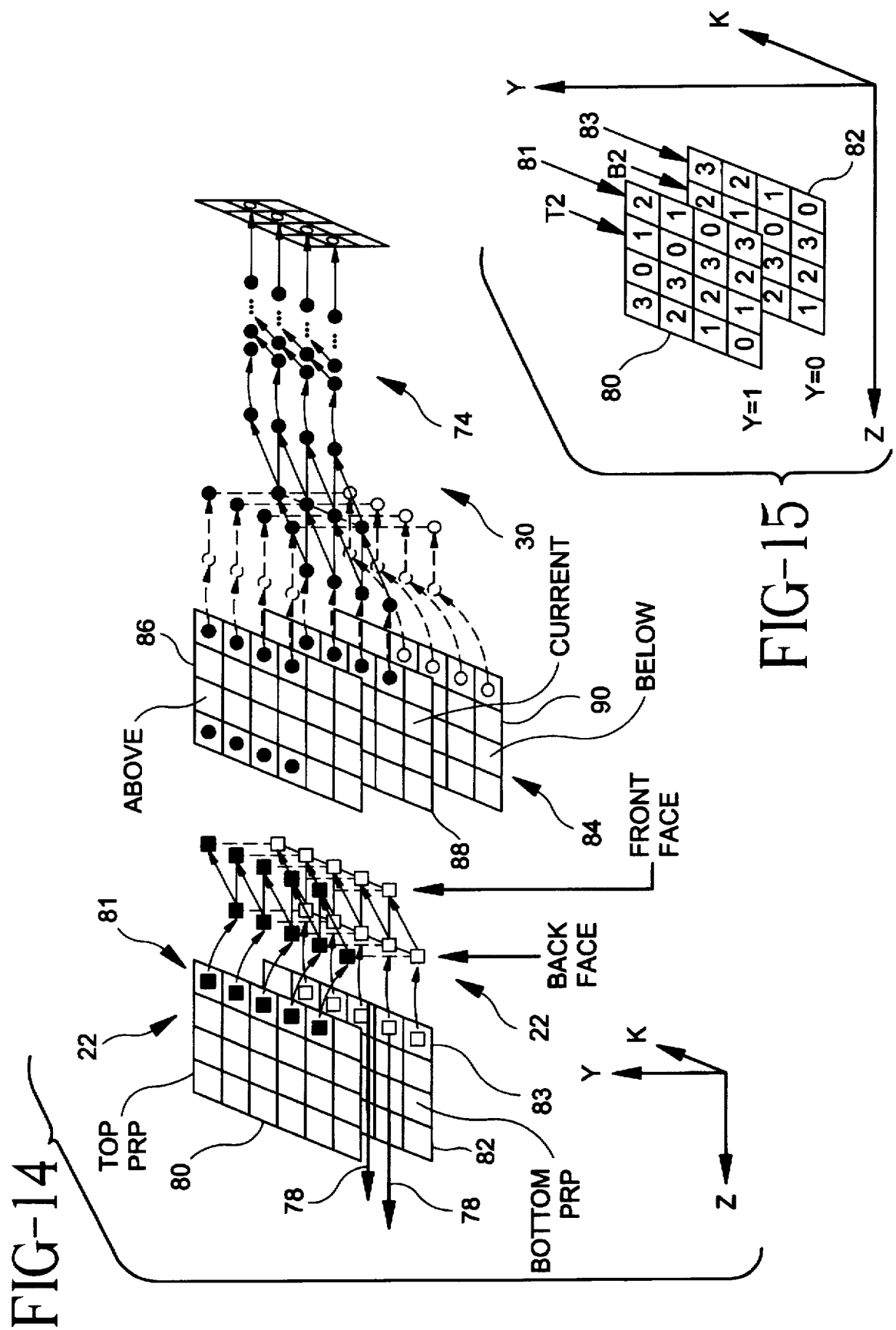

T = TRILIN
S = SHADER
C = COMPOS

APPARATUS AND METHOD FOR REAL-TIME VOLUME VISUALIZATION

BACKGROUND OF THE INVENTION

This is a continuation-in-part of application Ser. No. 08/301,205 filed on Sep. 6, 1994, now U.S. Pat. No. 5,594,842, which is a continuation of application Ser. No. 08/388,066 filed on Feb. 13, 1995, now abandoned.

STATEMENT OF GOVERNMENT RIGHTS

This invention was made with Government support under contracts MIP8805130 and CCR9205047 awarded by the National Science Foundation. The Government has certain rights in the invention.

The present invention relates to three dimensional (3-D) graphics and volumetric imaging, and more particularly to an apparatus and method for real-time parallel and perspective projection of high resolution volumetric images.

Image rendering is the process of converting complex information to a format which is amendable to human understanding while maintaining the integrity and accuracy of the information. Volumetric data, which consists of information relating to three-dimensional phenomena, is one species of complex information that can benefit from improved image rendering techniques. The process of analyzing volumetric data to determine, from a given viewpoint, which portions of a volume are to be presented is commonly referred to as volume visualization. Traditional methods of volume visualization operate by scanning through data points in a sequential manner in order to provide an accurate representation of an object. The need to model objects in real-time and the advantage of doing so using computer graphic systems is clear.

Special purpose computer architectures and methods for volume visualization are known. Referring now to FIG. 1, a volume visualization system 1 is shown. The volume visualization system 1 includes a cubic frame buffer 2 having a skewed memory organization which enables conflict free access of a beam of voxels in any orthographic direction, a two-dimensional (2-D) skewed buffer 4, a ray projection tree 6, and two conveyers 8, 10. The conveyors are commonly referred to as barrel shifters. A first conveyor 8 is coupled between the cubic frame buffer and the two dimensional skewed buffer, while a second conveyor 10 is coupled between the two-dimensional skewed buffer and the ray projection tree. This volume visualization system is capable of providing parallel projection in $O(n^2 \log n)$ time, where n is the measurement of one axis of the cubic frame buffer.

The operation and interrelationship of the cubic frame buffer 2 and the 2-D skewed buffer are shown in FIG. 2. The traditional volume visualization system 1 operates by casting viewing rays 12, originating at a pixel in a projection plane (not shown), through the cubic frame buffer 2 along a selected viewing direction. The viewing rays access a plurality of voxels 14 (defining a projection ray plane (PRP)16) stored in the cubic frame buffer. The voxels defining the PRP are simultaneously retrieved by orthogonal beams 18 and provided to the conveyor 8.

The conveyor 8 provides a 2-D shearing of the voxels of the orthogonal beams which define the PRP. This 2-D shearing serves to align all of the voxels of each discrete viewing ray along a direction parallel to a 2-D axis of the 2-D skewed buffer to provide skewed viewing rays. Once the viewing rays are aligned in the 2-D skewed buffer, the skewed viewing rays can be retrieved and processed by the ray projection tree 6.

Before the ray projection tree 6 receives the skewed viewing rays, the accessed skewed viewing rays are provided to conveyor 10. The conveyor 10 preforms a deskewing operation in order to match the physical sequential order of the input modules of the ray projection tree 6 to the sequential order of the voxels of each viewing ray. Specifically, each viewing ray is shifted such that the first voxel in each projection ray appears at the corresponding first input position of the ray projection tree. The voxels of each ray are then processed by the ray projection tree in parallel so as to generate a pixel value associated with that projection ray.

The above-disclosed volume visualization system has substantial shortcomings and drawbacks. First, the speed at which the system operates is limited by the system architecture which provides arbitrary parallel and orthographic projections in $O(n^2 \log n)$ time. Secondly, the ray projection tree requires that each projection ray be provided thereto in a specific orientation. This requires a conveyor between the two-dimensional skewed buffer and the ray projection tree which adds to the overall hardware required by the system and the time needed for volume visualization. Thirdly, the traditional system provides only surface approximations of discrete projection rays by utilizing the closest non-transparent discrete voxel to points along the discrete projection rays instead of actual values along the continuous projection rays. This provides a somewhat inaccurate representation of the object. Fourthly, the conveyors are not readily capable of shifting data in a manner required for perspective projection (fanning and defanning of data) and real-time visualization of four-dimensional (4-D) data.

It is therefore an object of the present invention to provide a method and apparatus which operate faster than existing volume visualization systems.

It is also an object of the present invention to provide a method and apparatus which is more efficient than existing volume visualization systems.

It is a further object of the present invention to provide a method and apparatus which provide better resolution and a more accurate representation of objects than existing volume visualization systems.

It is another object of the present invention to provide a method and apparatus which are readily capable of supporting perspective projection and real-time visualization of four-dimensional (4-D) data.

It is yet another object of the present invention to provide a method and apparatus that accesses voxel data from the cubic frame buffer only once per projection.

It is yet another object of the present invention to provide a method and apparatus which overcome the inherent disadvantages of known volume visualization systems.

Other and further objects will be made known to the artisan as a result of the present disclosure, and it is intended to include all such objects which are realized as a result of the disclosed invention.

SUMMARY OF THE INVENTION

In accordance with one form of the present invention, apparatus for generating a three-dimensional (3-D) volume projection image of an object from a desired viewing direction (defined by a plurality of viewing rays) includes at least an interpolation mechanism for receiving a plurality of voxel data signals in slice form (i.e., slices of voxel data that are parallel to any axis of the cubic frame buffer). The interpolation mechanism or any other suitable mechanism (i.e., the host computer) generates a plurality of sample points along each of the plurality of viewing rays and provides a plurality of interpolated sample point signals corresponding to the plurality of sample points utilizing the slices of voxel data signals.

The apparatus also includes a plurality of compositing units coupled to the interpolation mechanism. Each of the plurality of compositing units receives interpolated sample point signals from the interpolation mechanism and combines interpolated sample point signals associated with a particular viewing ray to provide a pixel value signal for each of the plurality of viewing rays.

The apparatus may further include a 3-D memory coupled to the interpolation mechanism for supplying voxel data signals thereto. The 3-D memory preferably includes a skewed memory organization that permits the simultaneous retrieval of a plurality of voxel signals representing a voxel beam (i.e., a ray of voxels parallel to a main axis of the 3-D memory storage device).

In accordance with one form of the present invention, the interpolation mechanism is a tri-linear interpolation device, wherein the plurality of voxel data signals received by the interpolation mechanism includes at least four voxel beams. The interpolation mechanism utilizes at least two voxels from each of the at least four voxel beams to generate an interpolated sample point value signal for each viewing ray sample point.

In accordance with another form of the present invention, the interpolation mechanism is a bi-linear interpolation device, wherein the plurality of voxel data signals received by the interpolation mechanism includes at least two voxel beams. The interpolation mechanism utilizes at least two voxels from each of the at least two voxel beams to generate an interpolated sample point value signal for each viewing ray sample point.

For implementation of perspective viewing and in accordance with another form of the present invention, the interpolation mechanism is a linear or higher order interpolation device, wherein the plurality of voxel data signals received by the interpolation mechanism includes at least two voxel beams. The linear or higher order interpolation device utilizes a plurality of voxels from each of the at least two voxel beams to generate an interpolated sample point value signal for each viewing ray sample point.

In accordance with another form of the present invention, the plurality of compositing units includes at least one of a front-to-back compositing mechanism, a back-to-front compositing mechanism, a first opaque projection mechanism, a last opaque projection mechanism, a maximum value projection mechanism, a weighted sum projection mechanism, a last-to-first cut projection mechanism and a first-to-last cut projection mechanism for generating the pixel value signal for each of the plurality of viewing rays.

In accordance with another form of the present invention, the apparatus may further include a shading mechanism which generates a gradient vector signal for each of the plurality of interpolated sample point signals. The shading mechanism provides a gradient vector signal which is indicative of surface inclination at the corresponding sample point. Generally, the shading mechanism combines interpolated sample points at each interpolated sample point. These interpolated sample points are preferably respectively, front, back, above, below, left and right of the sample point. The difference signals are combined to provide an indication of surface inclination at the first sample point.

In another embodiment of the present invention, the method for generating a three-dimensional (3-D) volume projection image of an object from a desired viewing direction includes selecting viewing parameters so as to access voxels stored in the cubic memory in a specific manner. Included among the viewing parameters are the viewing direction, the screen plane position, orientation upon which the image is to be projected, and the type of voxel compositing to be performed. The viewing direction defines a plurality of discrete ray planes (projection ray planes (PRP) or voxel planes) which are made of a plurality of voxels.

The method of the present invention also includes accessing a plurality of discrete voxel beams wherein each discrete voxel beam is preferably substantially parallel to a main axis of the cubic memory. Then a plurality of viewing rays are generated, one for each pixel of the display screen. Thereafter, a first sample point is accessed for each of the plurality of viewing rays and, utilizing the signals associated with at least two discrete voxel beams proximate to a corresponding first sample point, an interpolated voxel signal is determined for each first sample point.

The method further includes accessing a second sample point for each of the plurality of viewing rays and, utilizing the signals associated with at least two discrete voxel beams proximate to the second sample point, providing an interpolated sample point value signal for each second sample point. Thereafter, the first and second interpolated sample point signals for each of the plurality of viewing rays are combined, and subsequent interpolated sample point signals are generated and combined with the first and second interpolated sample point signals to generate a pixel value signal.

The pixel value signal may then be transformed in accordance with selected viewing parameters to provide a transformed pixel signal. The transformed pixel signal corresponds to one pixel of the 3-D volume projection image and defines characteristics of the pixel including color, translucency and contour. Thereafter, the transformed pixel signal associated with each continuous ray is displayed by a corresponding pixel of a display device.

The apparatus and method of the present invention surpasses existing 3-D voxel based graphics methods and architectures in terms of performance, simplicity, image quality, expendability and ease of hardware realization so as to provide real-time high resolution parallel and perspective volume viewing from any arbitrary direction.

A preferred form of the apparatus and method for real-time volume visualization, as well as other embodiments, objects, features and advantages of this invention, will be apparent from the following detailed description of illustrative embodiments thereof, which is to be read in connection with the accompany drawings.

BRIEF DESCRIPTION OF THE DRAWINGS

FIG. 8A is a diagram of the method of interpolation for a parallel projection;

FIG. 8B is a diagram of the method of interpolation for perspective projection;

FIG. 8C is a diagram of the method of interpolation for a parallel projection;

FIG. 8D is a diagram of the method of interpolation for a perspective projection;

FIG. 14 is a functional diagram of the method of the present invention.

FIG. 15 is a functional diagram showing the skewing scheme of voxel data for adjacent voxel beams and projection ray planes.

DETAILED DESCRIPTION OF THE PREFERRED EMBODIMENTS

The method and apparatus of the present invention are capable of manipulating data and supporting real-time visualization of high resolution voxel-based data sets. The method and apparatus are designed for use as a voxel-based system as described in the issued patents and pending applications of Arie Kaufman, a named inventor of this application, including "Method Of Converting Continuous Three-Dimensional Geometrical Representations Into Discrete Three-Dimensional Voxel-Based Representations Within A Three-Dimensional Voxel-Based System", which issued an Aug. 6, 1991, as U.S. Pat. No. 5,038,302; "Method Of Converting Continuous Three-Dimensional Geometrical Representations Of Polygonal Objects Into Discrete Three-Dimensional Voxel-Based Representations Thereof Within a Three-Dimensional Voxel-Based System", which issued on Jan. 22, 1991, as U.S. Pat. No. 4,987,554; "Method And Apparatus For Storing, Accessing, And Processing Voxel-Based Data", which issued on Jan. 15, 1991, as U.S. Pat. No. 4,985,856; "Method Of Converting Continuous Three-Dimensional Geometrical Representations of Quadratic Objects Into Discrete Three-Dimensional Voxel-Based Representations Thereof Within A Three-Dimensional Voxel-Based System", which was filed on May 4, 1989, as Ser. No. 07/347,593, which was abandoned in favor of U.S. Ser. No. 08/031,599, filed on Mar. 15, 1993 as a continuation application of the '593 application; "Method And Apparatus For Generating Arbitrary Projections Of Three-Dimensional Voxel-Based Data", which issued on Mar. 31, 1992 as U.S. Pat. 5,101,475; "Method And Apparatus For Real-Time Volume Rendering From An Arbitrary Viewing Direction", which was filed on Jul. 26, 1993, as U.S. Ser. No. 08/097,637; and "Method And Apparatus For Generating Realistic Images Using A Discrete Representation", which was filed on Mar. 20, 1992, as U.S. Ser. No. 07/855,223, the entire disclosure of each of these references is incorporated herein by reference.

Figure 1:
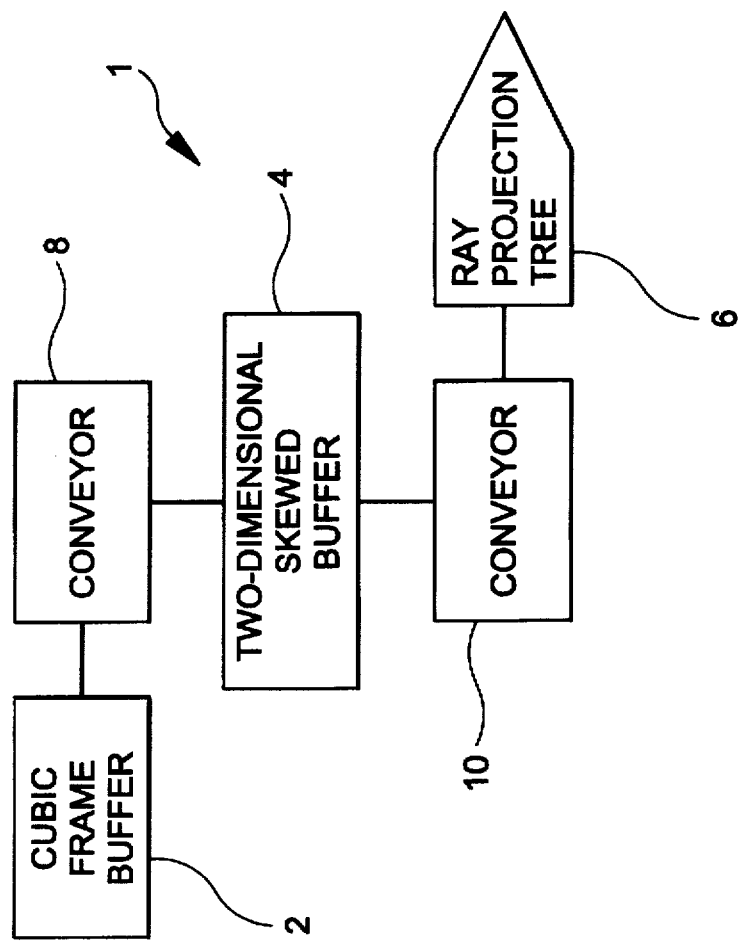
FIG. 1 is a block diagram of a traditional volume visualization system.
Figure 2:
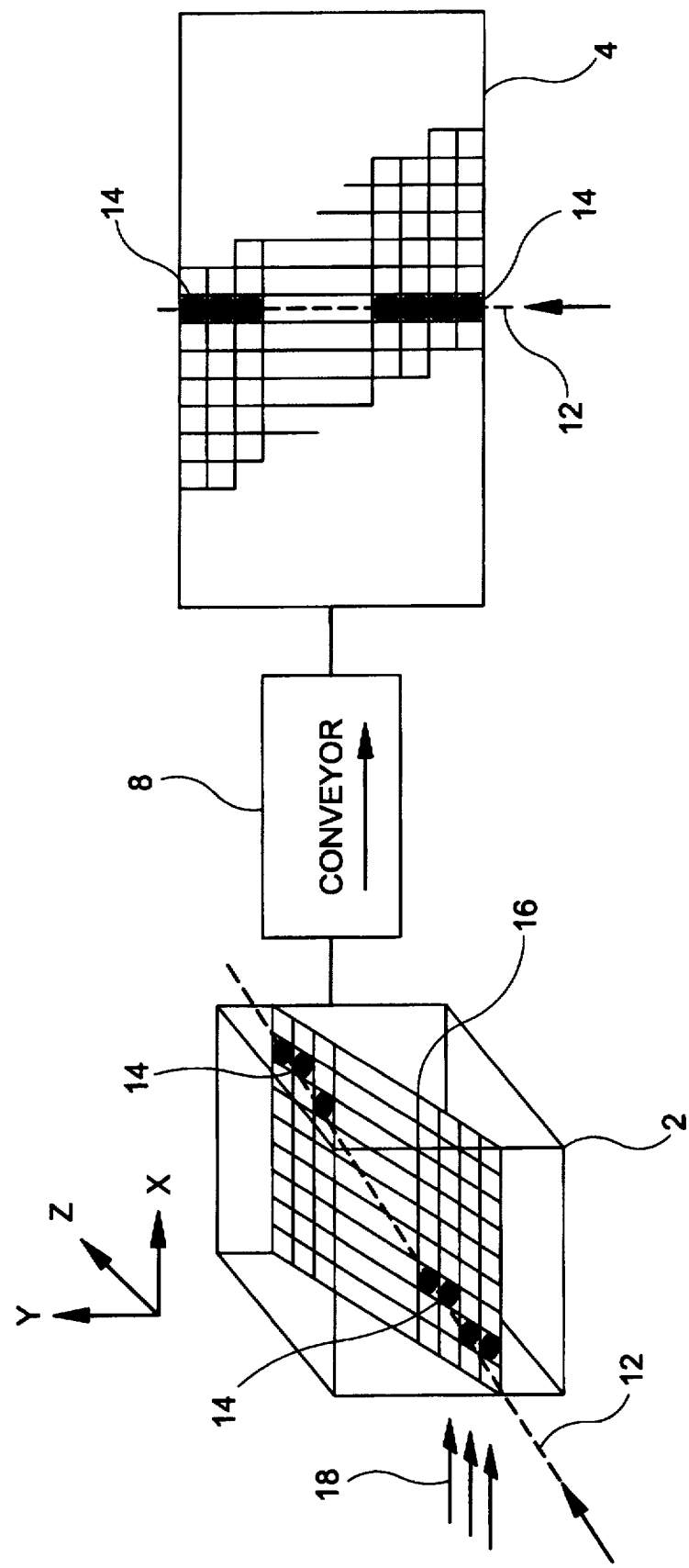
FIG. 2 is a representation showing the inter-relationship of a cubic frame buffer, viewing rays, orthogonal beams, projection ray planes and the two-dimensional skewed buffers of the traditional volume visualization system.
Figure 3:
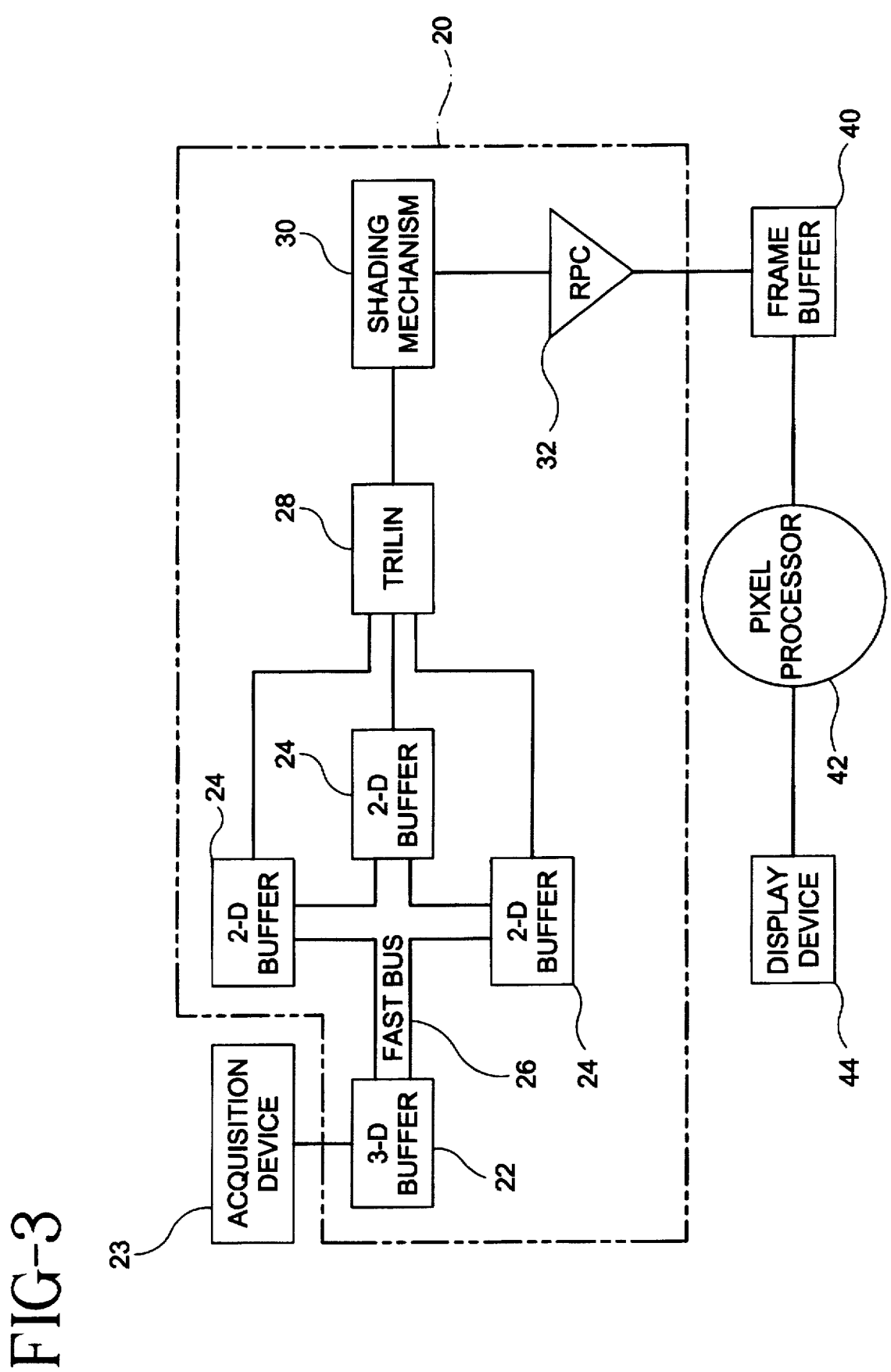
FIG. 3 is a functional block diagram of the apparatus for providing a 3-D volume projection of an object from a desired viewing direction constructed in a accordance with the present invention.

Referring now to FIG. 3, the apparatus of the present invention 20 preferably includes six basic components. These include a cubic frame buffer 22 having a plurality of memory storage units capable of storing voxels therein, three two-dimensional (2-D) buffers 24 and an interconnection mechanism 26 coupling the cubic frame buffer to each of the 2-D buffers. The cubic frame buffer is a three-dimensional (3-D) memory organized in n memory modules (or memory slices), wherein each memory module has $n^2$ memory storage units as described in the above-identified references. The cubic frame buffer also includes an independent dual access and addressing unit (not shown in the figures). A 3-D skewed memory organization, as described in the above-identified references, enables conflict-free access of any beam (i.e., a ray parallel to a main axis of the cubic frame buffer). The apparatus also includes an interpolation mechanism 28, shading mechanism 30 and projection mechanism 32.

The addressing unit of the cubic frame buffer 22 maps voxels in specific memory locations of the cubic frame buffer so as to provide conflict-free access of beams of voxels. Specifically, a voxel with space coordinates (x,y,z) is mapped onto the $k^{th}$ memory module by:

$$k=(x+y+z) \bmod n \quad 0 \leq k,x,y,z \leq n-1$$

Since beams of voxels are accessed such that two coordinates are always constant, the third coordinate guarantees that only one voxel from a corresponding beam resides in any one of the memory modules.

Each of the 2-D buffers 24 of the present invention are 2-D voxel storage devices having $2n^2-n$ memory storage units. The cubic frame buffer 22 is coupled to the 2-D buffers 24 by the interconnection mechanism 26. The interconnection mechanism, hereinafter referred to as the "fast bus", is an interconnection network that supports the high-bandwidth transfer of data (beams of voxels) from the cubic frame buffer to the 2-D buffer. The fast bus manipulates the beams of voxels including skewing, de-skewing, fanning and de-fanning the voxel beams in order to support both parallel and perspective projection. In a preferred embodiment, the fast bus employs multiplexers and transceivers with associated control units and a multi-channel bus to accomplish the data transfer speeds required for real-time volume visualization.

The voxels utilized in the volume visualization apparatus can be provided by a data acquisition device 23 (such as a scanner or M.R.I. device) or other mechanisms as known in the art.

Figure 4:
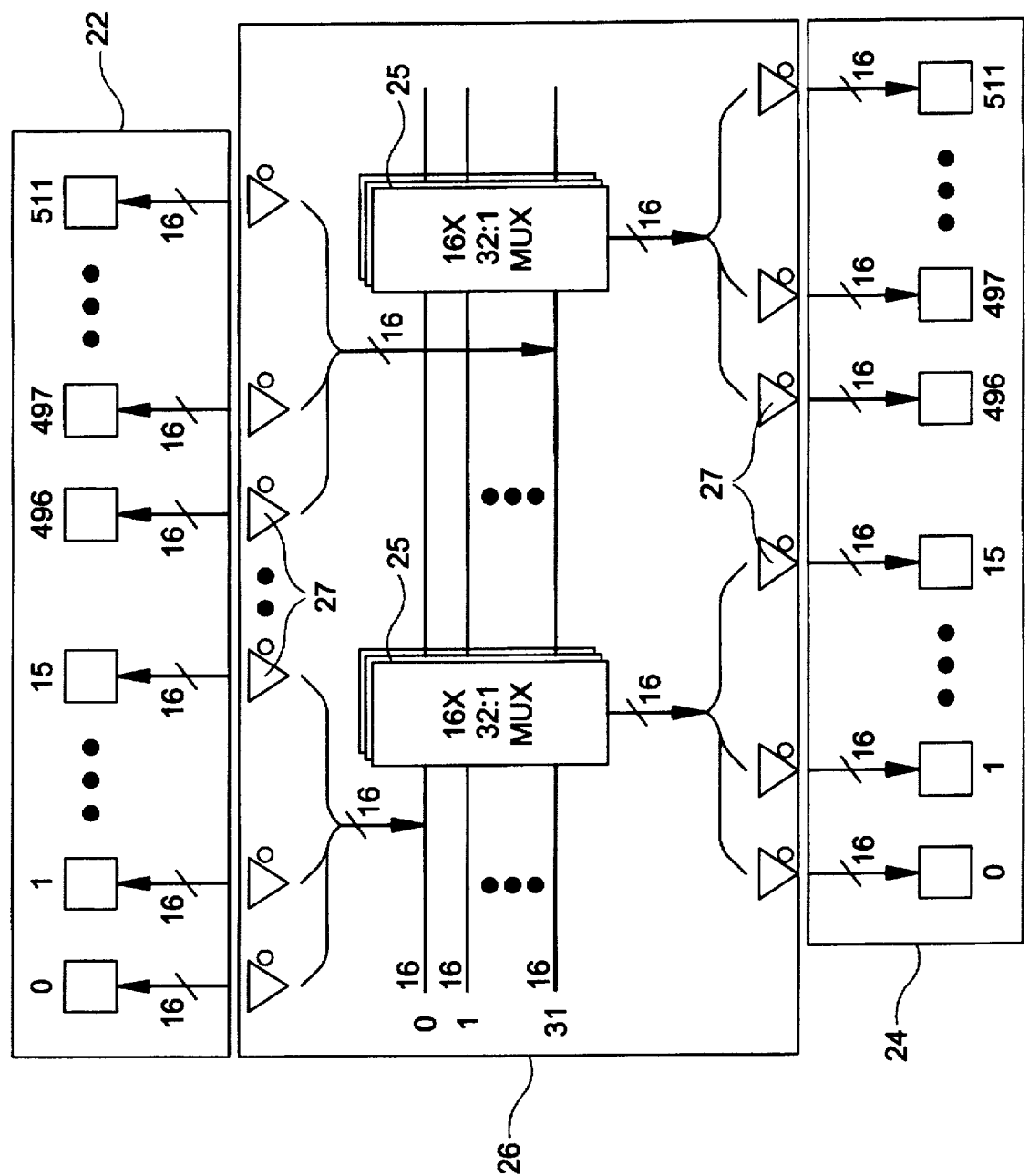
FIG. 4 is a functional block diagram of an interconnection mechanism which couples a cubic frame buffer and a two dimensional buffer.

Referring now to FIG. 4, a preferred form of the fast bus configuration is shown for a cubic frame buffer 22 having n=512 and a fast bus having 32 bus channels. As shown in the figure, the 512 memory modules of the cubic frame buffer are divided into 32 groups having 16 memory modules in each group. As a result, memory modules 0–15 transfer voxel information on channel 0 of the fast bus, memory modules 16–31 transfer voxel information on channel 1 of the fast bus and so on such that memory modules 496–511 transfer voxel information on channel 31 of the fast bus.

As previously stated, the fast bus includes a plurality of multiplexers 25 such that the voxel data from the memory modules (0–511) of the cubic frame buffer 22 are time-multiplexed onto a designated 16-bit fast bus channel for that group of memory modules. Table 1 shows the memory module data time-multiplexed on the fast bus. The signal multiplexing is achieved by utilizing a clock input with transceivers 27 associated with each memory module.

TABLE 1

| Channel | Time Slice | | | | |
|---|---|---|---|---|---|
| | 00 | 01 | ... | 14 | 15 |
| 00 | 000 | 001 | ... | 014 | 015 |
| 01 | 016 | 017 | ... | 030 | 031 |
| . | . | . | . | . | . |
| . | . | . | . | . | . |
| . | . | . | . | . | . |
| 30 | 480 | 481 | ... | 494 | 495 |
| 31 | 496 | 497 | ... | 510 | 511 |

As shown in FIG. 4, the 2-D buffers are divided into 32 groups wherein each group includes 16 memory modules. For each group of the memory modules of the 2-D buffer, voxel data from the 32 channels of the fast bus are provided into a respective memory module of the group of 16 memory modules.

The operation of the multiplexers 25 and transceivers 27 are controlled by a look-up table commonly referred to as the bus channel map. The bus channel map is pre-computed based upon selected viewing parameters (i.e., viewing direction, etc.). A change in the selected viewing parameters requires a re-computation of the look-up table. However, the limited size of the look-up table allows the re-computation to occur without affecting the real-time volume visualization and processing provided by the system.

Referring again to FIG. 3, the apparatus of the present invention 20 also preferably includes an interpolation mechanism 28 coupled to the 2-D buffers 24. In a preferred embodiment of the invention, the interpolation device is a tri-linear (TRILIN) interpolation mechanism which receives information about continuous viewing rays that are cast, preferably from the selected viewing position, through the cubic frame buffer 22. At evenly spaced locations along each viewing ray, sample points are indicated. The interpolation mechanism performs a tri-linear interpolation utilizing voxel data corresponding to pixel points proximate to each viewing ray sample point in order to determine interpolated voxel values for the sample points. These interpolated voxel values are used for providing a more accurate volume visualization image.

The apparatus of the present invention may also include a shading mechanism 30 coupled to the interpolation mechanism 28. Alternatively, the shading mechanism can be coupled directly to each of the 2-D buffers 24. In a preferred embodiment of the present invention, the shading mechanism receives viewing ray and sample point information from the interpolation mechanism. Thereafter, the shading mechanism receives the voxel data values proximate each viewing ray sample point. More specifically, the shading mechanism receives discrete voxel rays on the immediate left, right, above and below as well as the values of the viewing ray sample points proximate the current sample point. Based on the voxel information provided, a gradient vector for each sample point is determined by taking the differences of all voxel values proximate each sample point to provide an indication of the direction and amount of change in the characteristics of the object.

Figure 5A:
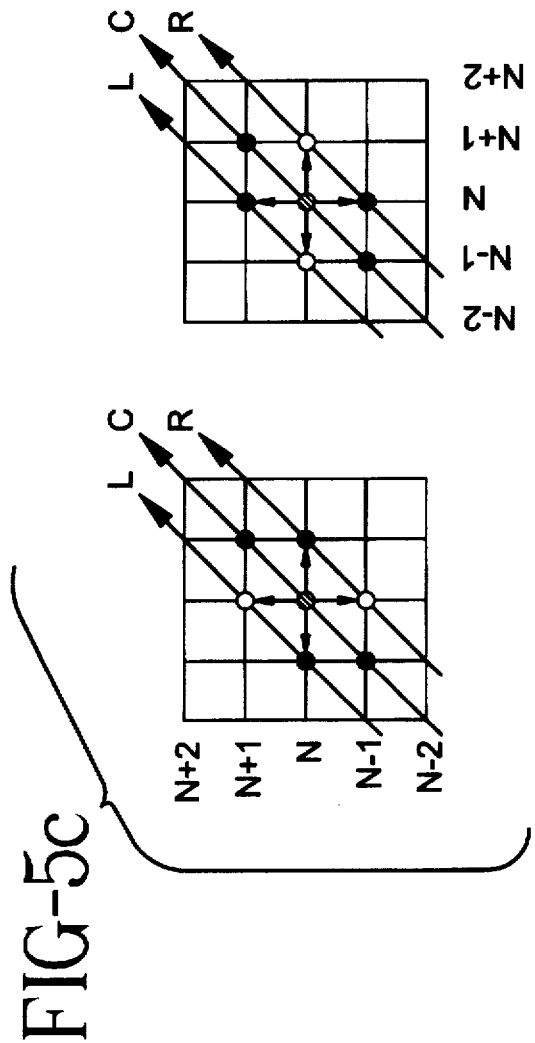
FIG. 5A is a graph of a 10-neighborhood gradient estimation method in accordance with the present invention.
Figure 5B:
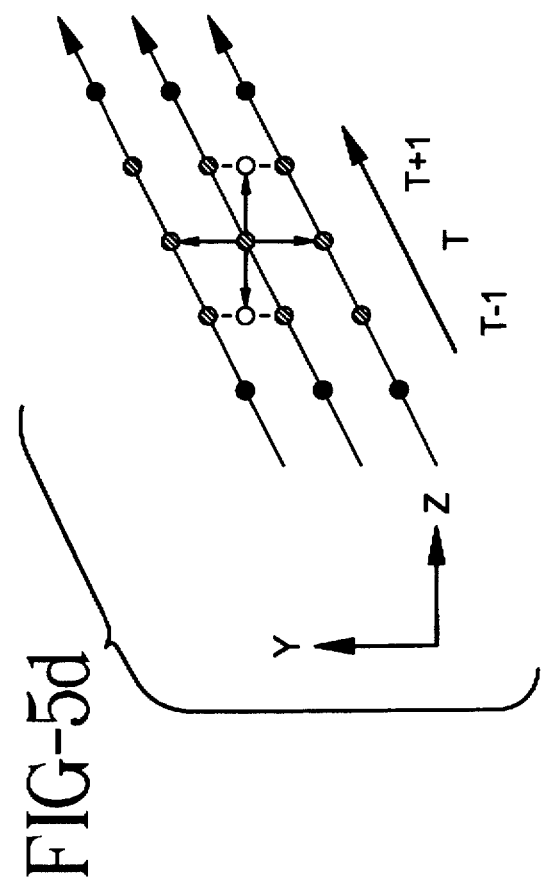
FIG. 5B is a graph of a 26-neighborhood gradient estimation method is accordance with the present invention.

FIGS. 5A and 5B illustrate two different gradient estimation schemes. The most simple approach (not shown) is the 6-neighborhood gradient. This method uses the difference of neighboring sample values along the continuous ray, $P(n, m+1)-P(n,m-1)$ in the x direction and $P(n+1,m+1)-P(n-1, m-1)$ in the y direction. Although the left, right, above and below ray samples are in the same plane and orthogonal to each others the samples in the y direction of the ray are not. More importantly, when a change in the viewing direction causes a change in the major axis from m to n, the values of $P(n+1,m)-P(n-1,m)$ are used to calculate the gradient in the x direction. This leads to noticeable motion aliasing.

In a preferred form of the present invention as shown in FIG. 5A, the aliasing problem is circumvented by performing an additional linear interpolation. The additional step includes resampling the neighborhood rays at positions that are orthogonal (black samples) to the current sample point. This approach is commonly referred to as the 10-neighborhood gradient estimation, and it solves the problem of switching the major axis during object rotations.

Referring now to FIG. 5B, the use of a 26-neighborhood gradient will be described. Instead of fetching sample values from four neighboring rays, 26 interpolated samples from 8 neighboring rays are fetched and the gradient is estimated by taking weighted sums (i.e., the voxels closest to the sample point are given the greatest weight in determining the gradient) inside and differences between adjacent planes. This method leads to better over all image quality, but the switching of major axis is still noticeable, although less than with the 6-neighborhood gradient method.

Figure 5C:
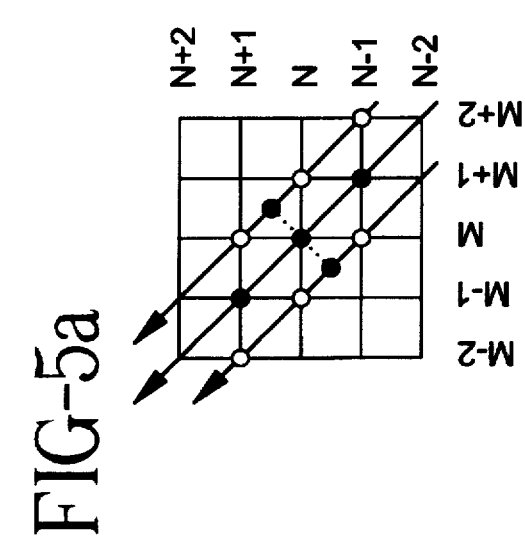
FIG. 5C is a graph of a 12-neighborhood gradient estimation method in accordance with the present invention.
Figure 5D:
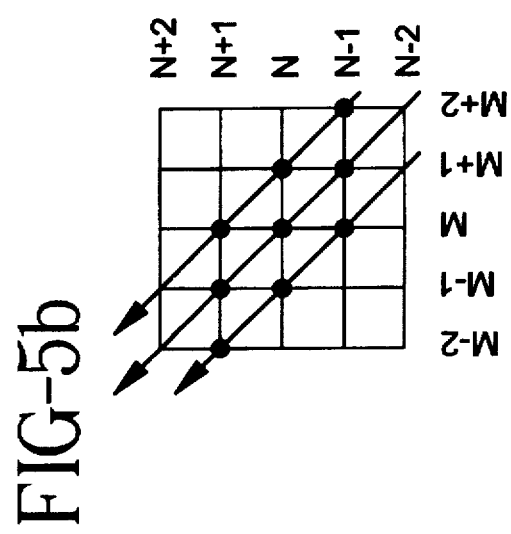
FIG. 5D is a graph of an 8-neighborhood gradient estimation method in accordance with the present invention.

In an alternative form of the present invention as shown in FIG. 5C and 5D, the aliasing problem is circumvented by performing an additional linear interpolation. The additional step includes resampling the neighborhood rays at positions that are orthogonal (white samples) to the base plane. Depending upon the position of the new positions, either a bi-linear interpolation or a linear interpolation has to be performed. These approaches are commonly referred to as the 12-neighborhood and 8-neighborhood gradient estimation, respectively. Each of these schemes serve to solve the problem of switching the major axis during object rotations and provide gradient vectors that are orthogonal to the main axis of the data set.

In the case of perspective projections, the front of each projection ray plane (PRP) is uniformly sampled with n rays one unit apart. As the rays diverge towards the back of the cubic frame buffer, volume, the distance between rays increases, and the averaged value, as previously explained, is utilized.

The shading mechanism preferably also includes a light vector lookup table. By knowing the gradient value and the values of the light vector look-up table, an intensity of each sample point can be generated using a variety of shading methods (e.g., using an integrated Phong Shader as known in the art). In order to display translucency at a sample point, opacity values are generated using a transfer function represented as a 2-D lookup table indexed by sample density.

Referring again to FIG. 3 and as mentioned previously, the present invention also preferably includes a projection mechanism (RPC) 32. The projection mechanism receives interpolated voxel values (corresponding to viewing ray sample points) from the interpolation mechanism 28, combines the interpolated voxel values in one of the variety of ways, and generates a pixel value for each viewing ray. The pixel value corresponds to the color, opacity and texture of the object or space being represented at a corresponding pixel location. Preferably, the projection mechanism is able to combine the interpolated voxel values with either back-to-front compositing, front-to-back compositing, first opaque projection, weighted sum projection, last-to-first cut projection or first-to-last cut projection (which provides a volume visualization of a cross section of an object or region having a specified thickness).

Figure 6:
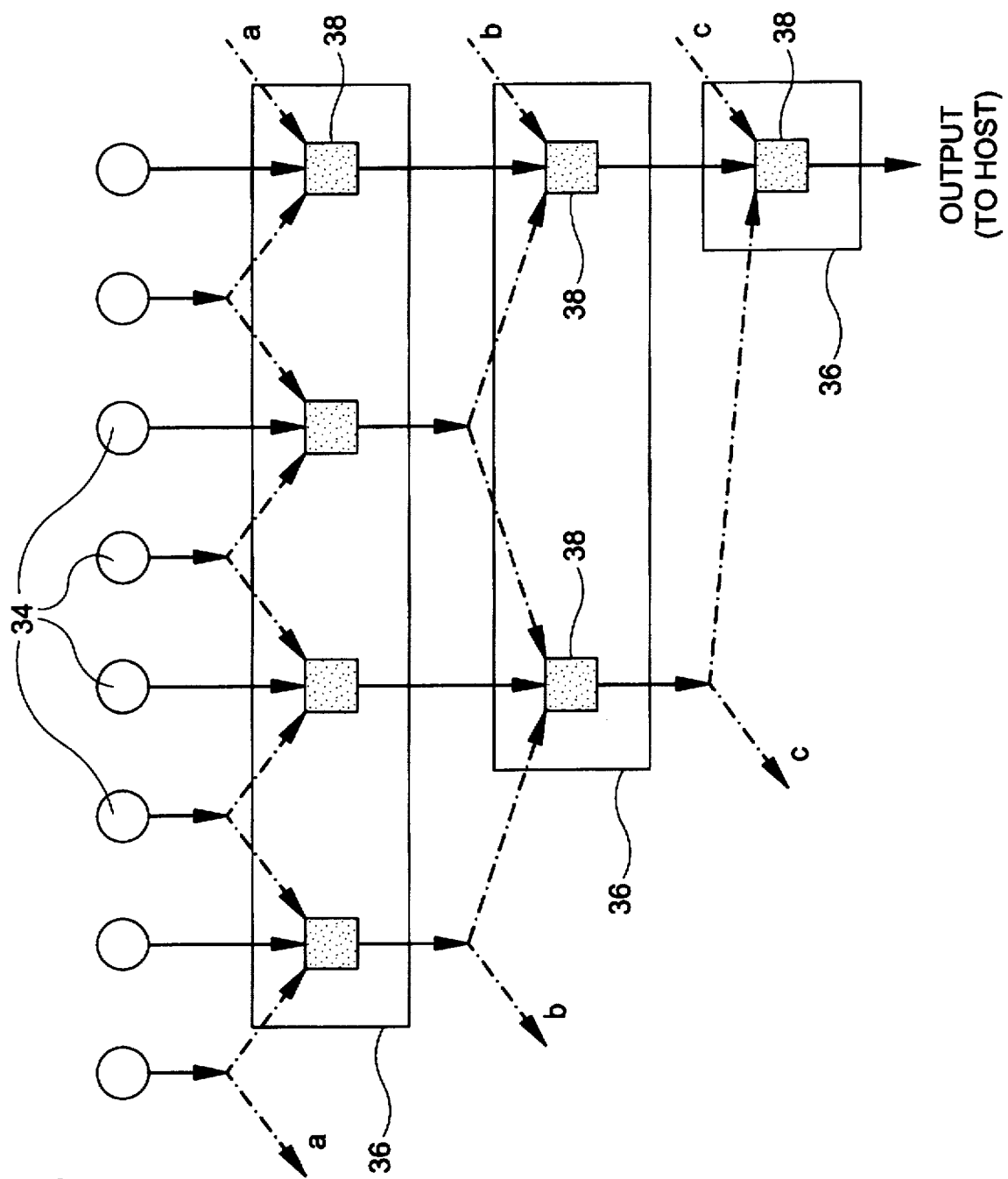
FIG. 6 is a functional block diagram of a projection mechanism constructed in accordance with the present invention.

In the preferred embodiment of the present invention, the projection mechanism is a ray projection cone (RPC) which generates one pixel value signal per clock cycle using a variety of projection schemes as described above. As shown in FIG. 6, the ray projection mechanism includes a plurality of input ports 34 for receiving the plurality of interpolated sample signals for each of the plurality of continuous viewing rays. Coupled to each of the plurality of input ports 34 are a plurality of voxel combination stages 36. Each voxel combination stage includes a plurality of voxel combination units (VCU) 38. As shown in FIG. 6, each successive voxel combination stage includes fewer VCU than the previous voxel combination stage. Each VCU is preferably coupled to three input ports 34. However, in the preferred embodiment, the RPC is designed to select only two interpolated sample signals from two of the three input ports or preceding VCU's. Specifically each VCU selects as input the left and center or right and center connection for receiving input signals depending upon the selected viewing scheme.

As shown in FIG. 6, the RPC is a folded (circular) cross-linked binary tree with n leaves, which can be dynamically mapped onto a tree with its leftmost leaf at any arbitrary end-node of the RPC. This allows the processing of a viewing ray of voxels such that the first voxel of the ray can be provided to any input port of the RPC. This in turn allows the cone to be hardwired to the outputs of the 2-D buffers which contain the voxels. Such a configuration eliminates the need for a set of n, n-to-1 switching units or barrel shifters for de-skewing of the 2-D buffer data as was required by prior art ray projection mechanisms. In a preferred embodiment of the invention, the leaves of the cone contain the TRILIN and the shading mechanism.

Preferably, the RPC accepts as input a set of n interpolated sample signals along the viewing ray and produces a pixel value signal for the pixel corresponding to the associated viewing ray. As shown in FIG. 6, the cone is a hierarchical pipeline of n−1 primitive computation nodes VCU. At any given time frame, the cone is processing log n viewing rays simultaneously in a pipelined fashion, producing a new pixel value signal corresponding for one pixel of the display every clock cycle.

The opacity of each voxel may be pre-stored with every voxel or provided through a look-up table or a transfer function inside the shading mechanism at the leaves of the cone. In a preferred embodiment, the VCU produces an output signal by performing one of the following operations:

| First opaque: | if($\alpha_L$ is opaque) | $V = V_L$ |
| | else | $V = V_R$ |
| Maximum value: | if($C_L < C_R$) | $V = V_R$ |
| | else | $V = V_L$ |
| Weighted sum: | $C^1 = C_L + W_k C_R$ | | where W is the weighting factor and k is the cone level (i.e., the number of voxel combination stages). $W_k$ is pre-computed and pre-loaded into the VCU's. It should be mentioned that a weighted sum is useful for depth cueing, bright field, and x-ray projections. Compositing is determined by the following:

$$C' = C_L + (1-\alpha_L)C_R$$

$$\alpha' = \alpha_L + (1-\alpha_L)\alpha_R$$

where the first level VCU's compute $C_j = C_j\alpha_j$, assuming the values are gray-levels. This is actually a parallel implementation of the front-to-back (or back-to-front) compositing. The pixel value is transmitted, for example, to a general purpose host computer or a pixel processor 42, where post-processing, such as post-shading, splatting, and 2-D transformation or warping, is preformed.

Referring again to FIG. 3, the apparatus of the present invention may also include a frame buffer 40, pixel processor 42 and display device 44 coupled to the projection mechanism. Preferably, the pixel value signal generated by the projection mechanism 32 is provided to the frame buffer 40 where each pixel value signal is stored, provided to the pixel processor 42 for 2-D transformation, filtering or warping, and thereafter provided to a display device 44 for visual display. The pixel processor 42, as is known in the art, transforms the pixel value signal so that it can be properly displayed on the display device.

Referring now to FIGS. 7–11, the interpolation mechanism 28 and the method of determining interpolated sample value signals will now be described. The interpolation mechanism 28 of the present invention generates a voxel value signal at non-voxel locations by utilizing the eight surrounding voxels and interpolating as follows:

$$\begin{aligned}P_{abc} = {} & P_{000}(1-a)(1-b)(1-c) + P_{100}a(1-b)(1-c) + \\ & P_{010}(1-a)b(1-c) + P_{001}(1-a)(1-b)c + \\ & P_{101}a(1-b) + P_{011}(1-a)bc + \\ & P_{110}ab(1-c) + P_{111}abc.\end{aligned}$$

The relative 3-D coordinate of a corresponding sample point within the cubic frame buffer with respect to a corner voxel closest to the origin is (a,b,c). The data values associated with the corner voxels of the cubic frame buffer are $P_{ijk}$, where i, j, k=0 or 1, and the interpolated data value associated with the sample point is $P_{abc}$. Different optimizations aim at reducing the arithmetic complexity of this method, but the arbitrary memory access to fetch eight neighboring voxels for each sample point makes this one of the most time consuming operations during volume rendering.

By transforming discrete rays of the PRP that are stored in the cubic frame buffer so that they are aligned, and storing them in two 2-D buffers as previously described, the data access time can be greatly reduced. Instead of fetching the eight-neighborhood of voxels of each resampling location, four discrete rays are fetched from the buffer, two from each of the projection ray planes (PRP) above and below the current ray. The projection ray planes are provided from the 2-D buffers. In parallel implementations of the interpolation method, neighboring rays reside in adjacent interpolation modules, requiring only a local shift operation of one voxel unit between neighbors.

Figure 7B:
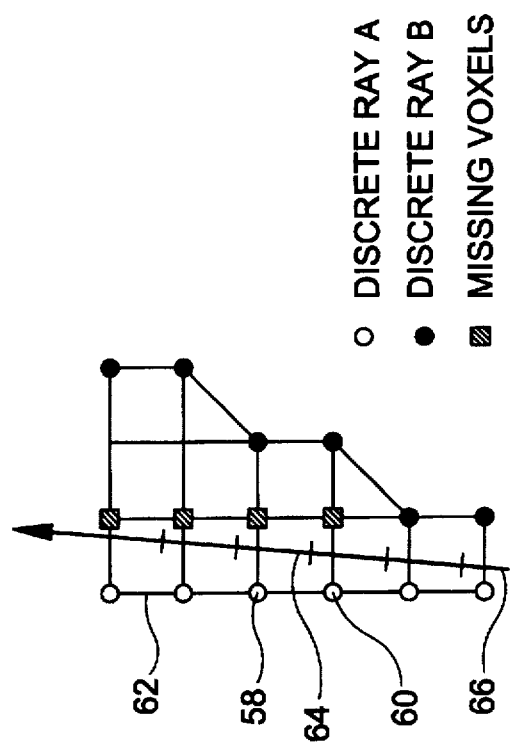
FIG. 7B is a graph of a second method of interpolation utilized in accordance with the present invention.
Figure 7A:
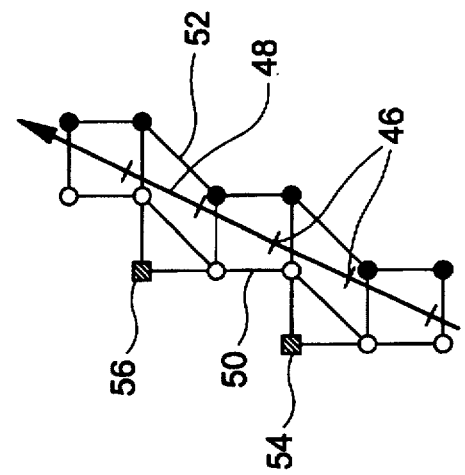
FIG. 7A is a graph of a first method of interpolation utilized in accordance with the present invention.

An interpolation method is shown in FIGS. 7A and 7B. Referring to FIG. 7A, sample points 46 on the continuous ray 48 are interpolated using bi-linear interpolation between samples of proximate discrete rays 50 (white) and 52 (black). The first sample point of the continuous ray 48 can be correctly interpolated using four voxels from discrete rays 50, 52 since the four voxels form a rectangle (i.e., the rays do not make a discrete step to the left or right).

As soon as the discrete rays step to the left or right as is the case for the second and fourth samples along the continuous ray 48, the four adjacent voxels form a parallelogram, and a straightforward bi-linear interpolation might not provide accurate voxel sample values. Therefore, the grey shaded square voxels 54,56 are required to yield a more accurate result. However, these voxels reside on discrete rays two units away from the continuous ray 48.

Referring now to FIG. 7B, the problem of not utilizing the best voxel point to provide an interpolated sample signal is shown for perspective projections. Since discrete rays diverge for perspective viewing, the correct neighboring voxels are not stored in the 2-D buffers. For example, only two voxels 58, 60 of discrete ray 62 contribute to the correct interpolation of the third sample point 64 of the continuous ray 66. In the 3-D case, as many as six voxels may be missing in the immediate neighborhood of sample point 64 for perspective projections.

The solution is to perform a sheared tri-linear interpolation by dividing the method into four linear and one bi-linear interpolation. Instead of specifying the sample location with respect to a corner voxel closest to the origin as was done with previous methods, each 3-D coordinate along the continuous ray consists of relative weights for linear interpolations along each axis in possible sheared voxel neighborhoods. These weights can be pre-computed and stored in templates.

Referring now to FIG. 8A–8D, the steps necessary for interpolation in 3-D are shown for both parallel projection (FIGS. 8A and 8C) and perspective projection (8B and 8D). First, four linear interpolations are performed in the direction of the major axis (the Z-axis is the major direction of travel of the continuous ray) using eight voxels of four neighboring discrete rays stored the 2-D buffers. As shown in FIGS. 8A and 8B, these eight voxels are the vertices of an oblique parallelepiped for parallel projections or of a frustum of a pyramid for perspective projections. Four voxels each reside on two separate planes one unit apart, which are commonly called the front or the back plane depending on when it is encountered during ray traversal in the direction of the major axis. Therefore, only one weight factor has to be stored, corresponding to the distance between the front plane and the position of the ray sample point. The resulting four interpolated values form a rectangle and can be bi-linearly interpolated to yield the final interpolated sampled value. This bi-linear interpolation is divided into two linear interpolations between the corner values and the final linear interpolation between the edge values. In FIGS. 8C and 8D, this is shown as two interpolations in the X-direction followed by one interpolation in the Y-direction.

Figure 9:
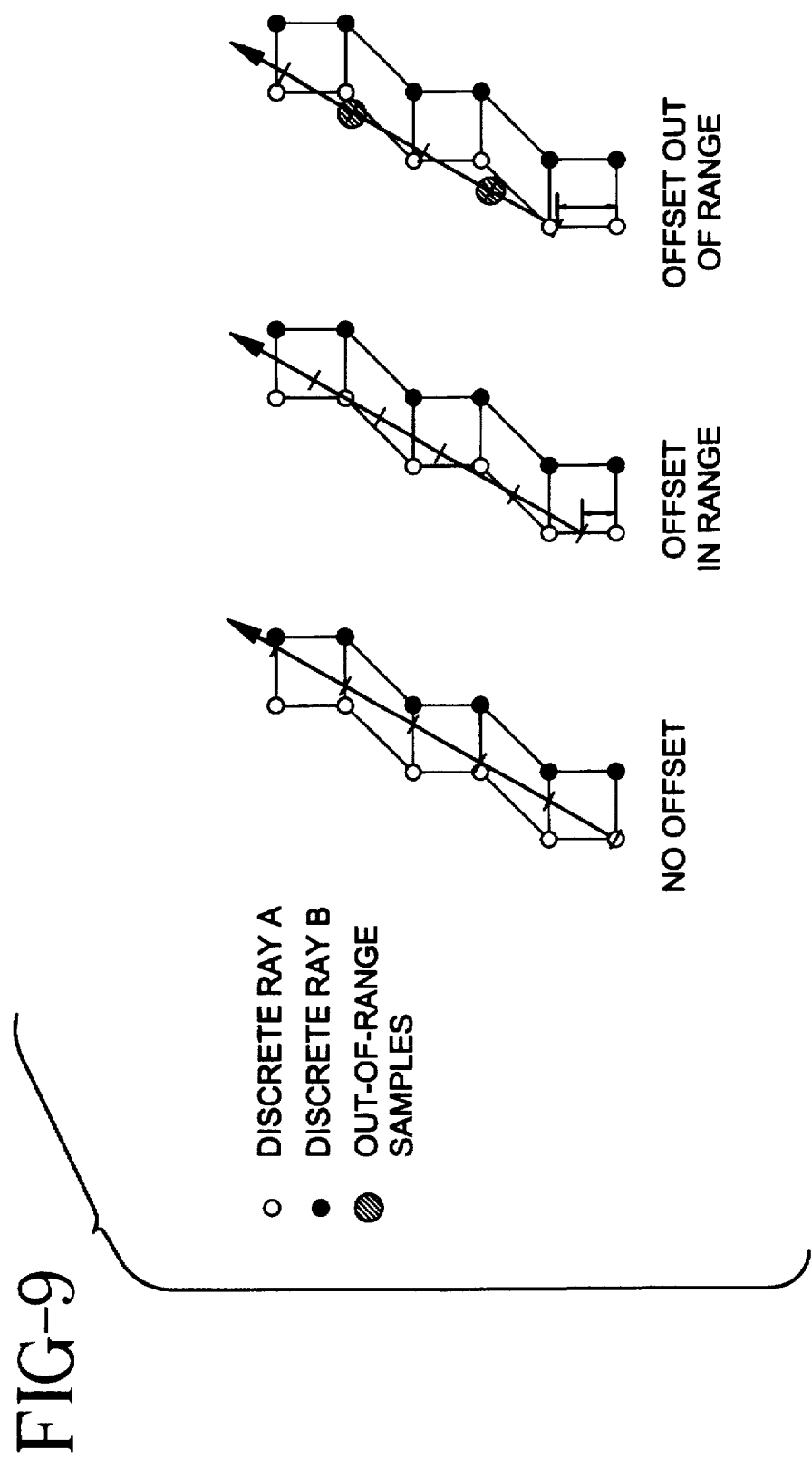
FIG. 9 is a diagram of a modified method for interpolation in accordance with the present invention.

The sample points corresponding to the continuous rays are preferably inside the polyhedron defined by the voxels on the four surrounding discrete rays. When constructing the discrete rays, all continuous rays start at integer positions of the base plane (i.e., they coincide with voxels of the first slice of the volume dataset). As shown in FIG. 9, the use of these rays during ray casting effectively reduces the tri-linear interpolation to a bi-linear interpolation, because all sample points along the ray fall onto the front planes of the parallelepiped or pyramid frustum.

Referring now to FIG. 9 (no offset drawing), utilizing X and Y integer positions on the base-plane permits an offset from the base-plane in the major direction of ray transversal as a degree of freedom and enables sheared tri-linear interpolations. However, as shown in FIG. 9 (offset out of range drawing) for offsets in the major direction that are relatively large, some of the samples along the ray may fall outside the bounding box defined by the discrete rays.

Figure 10:
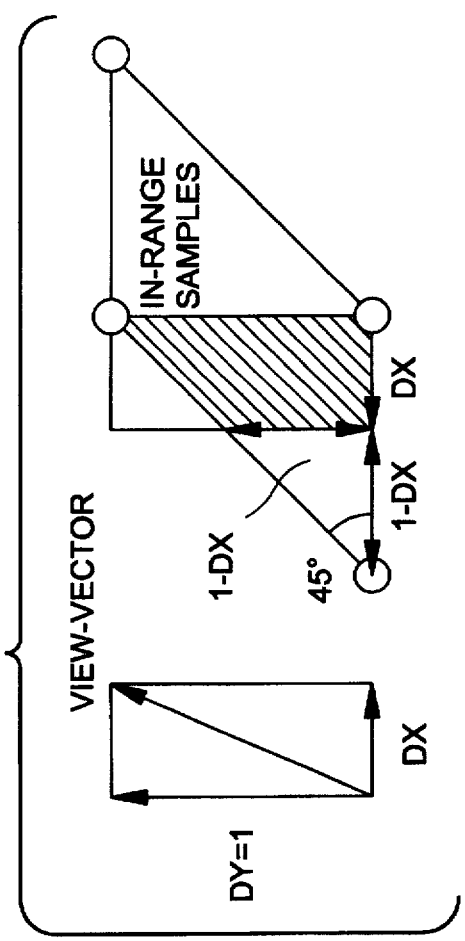
FIG. 10 is a diagram of the maximum offset estimation for use in a method of interpolation in accordance with the present invention.

Referring now to FIG. 10, a continuous viewing vector is split into a dx component along the X-axis (dx and dy in 3-d) and a unit vector in direction of the major axis (the Y-axis). By stepping in the direction of the major axis, the viewing vector may be added to the current sample position in order to get the new sample position.

Suppose that the addition of dx at the current sample position leads to a step of the discrete rays in the x direction. This step can only occur if the current sample position has a relative x offset with respect to the lower left corner voxel of more than 1−dx for positive dx (or less than 1+dx for negative dx). In other words, the current sample position was inside the rectangle of side dx by 1 shown in FIG. 10. However, only the shaded region of this rectangle contains sample positions inside the parallelepiped defined by the corner voxels. Taking the smallest side in the major axis as the worst-case, this means that in-range samples have maximal relative y offsets of no more than 1−dx for positive dx (no less than 1+dx for negative dx).

Since stepping is performed with a unit vector in the direction of the major axis, all relative offsets along the continuous ray are determined by the offsets of the first ray samples from the base-plane. The above argument easily extends to 3-D, making the maximum allowed offset in the direction of the major axis:

$\min(1-dx, 1-dy), dx, dy \geq 0$ $\min(1+dx, 1-dy), dx < 0, dy \geq 0$ $\min(1-dx, 1+dy), dx \geq 0, dy < 0$ $\min(1+dx, 1+dy), dx, dy < 0,$ where dx and dy are the components of the viewing vector in the x and y directions, respectively. Notice that for 45° viewing angle, dx and dy are 1, yielding an offset of 0 and bi-linear interpolation as shown in FIG. 9.

In the preferred embodiment of the invention, a single ray is cast from the origin of the image plane onto the base-plane using uniform distance between samples and the offset is chosen in the major direction of the first sample after the ray penetration of the base-plane. If necessary, the offset iteratively reduced until it satisfies the above condition. This leads to view dependent offsets in the major direction of travel and to varying resampling of the dataset. The variation of resampling points according to the viewing direction is an advantage for interactive visualization, because more of the internal data structure can be revealed.

Each discrete ray consists of n voxels, independent of the viewing direction. Since the maximum viewing angle difference with the major axis is not more than 45 degrees, the volume sample rate is defined by the diagonal through the cube and is by a factor of √3 higher for orthographic viewing. It has been found that for ray-compositing, this is not an important consideration due to the averaging nature of the compositing operator.

A more severe problem is the varying size of the sample neighborhood. For parallel projections, the eight voxels surrounding the sample point either form a cube with sides of length one or an oblique parallelepiped as shown in FIG. 8A. For perspective projections, however, the surrounding voxels may form the frustum of a pyramid with parallel front and back planes as in FIG. 8B. Due to the divergence of rays towards the back of the data set, the column spanned by this frustum increases, thereby reducing the precision of the tri-linear interpolation. However, it has been found that the distance between neighboring discrete rays at the end of the volume never exceeds two voxels for a $256^3$ dataset while still achieving a high amount of perspectivity. Furthermore, in typical datasets, the samples at the back of the volume have little influence on the final pixel color due to compositing along the ray.

Figure 11:
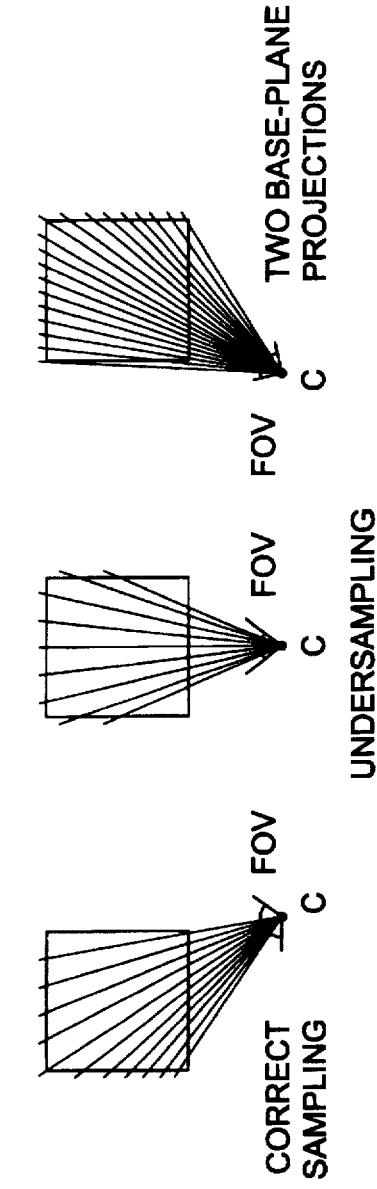
FIG. 11 is a diagram showing the sampling rates of the cubic frame buffer based upon differing fields of view.

The center of projection (C) and the field-of view (FOV) in perspective projections also influence the sampling rate. The discrete line algorithm casts exactly one ray per pixel of the base-plane, or a maximum of 2n rays per scanline. Referring now to FIG. 11, in cases where the FOV extends across the dataset, this guarantees better sampling than regular image order ray-casting which would cast n rays scanning the FOV and send wasteful rays that miss the dataset. However, for a small FOV the discrete line stepping yields undersampling in the active regions of the base-plane. The third illustration of FIG. 11 shows a case where two base-plane images contribute to the final view image. This is the worst case in the generation of three base-plane projections for a single perspective image.

As is evident from the above description, the apparatus and method of the present invention provides a more accurate representation of the object or scene being displayed due to the interpolation and shading included in the invention. In addition, since the present invention does not require conveyors or the like as used in prior art devices, the apparatus of the present invention operates more efficiently and faster than the prior art systems because the data manipulation is performed "on the fly" in a high parallel manner. Specifically, the apparatus and method performs in $O(n^2)$ time as compared to the prior art system which performs in $O(n^2 \log n)$ time. In addition, since the interconnection mechanism is capable of performing both de-skewing for parallel projection and de-fanning for perspective projection (i.e., a form of data compression), the present invention is capable of supporting perspective projection and real-time visualization of four dimensional (4-D) data.

Figure 13:
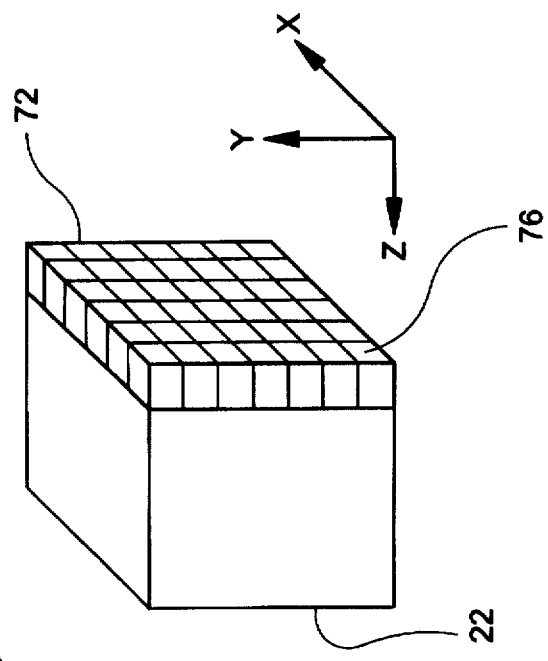
FIG. 13 is a functional diagram showing a voxel beam and a slice of voxel data as part of a cubic frame buffer.
Figure 12:
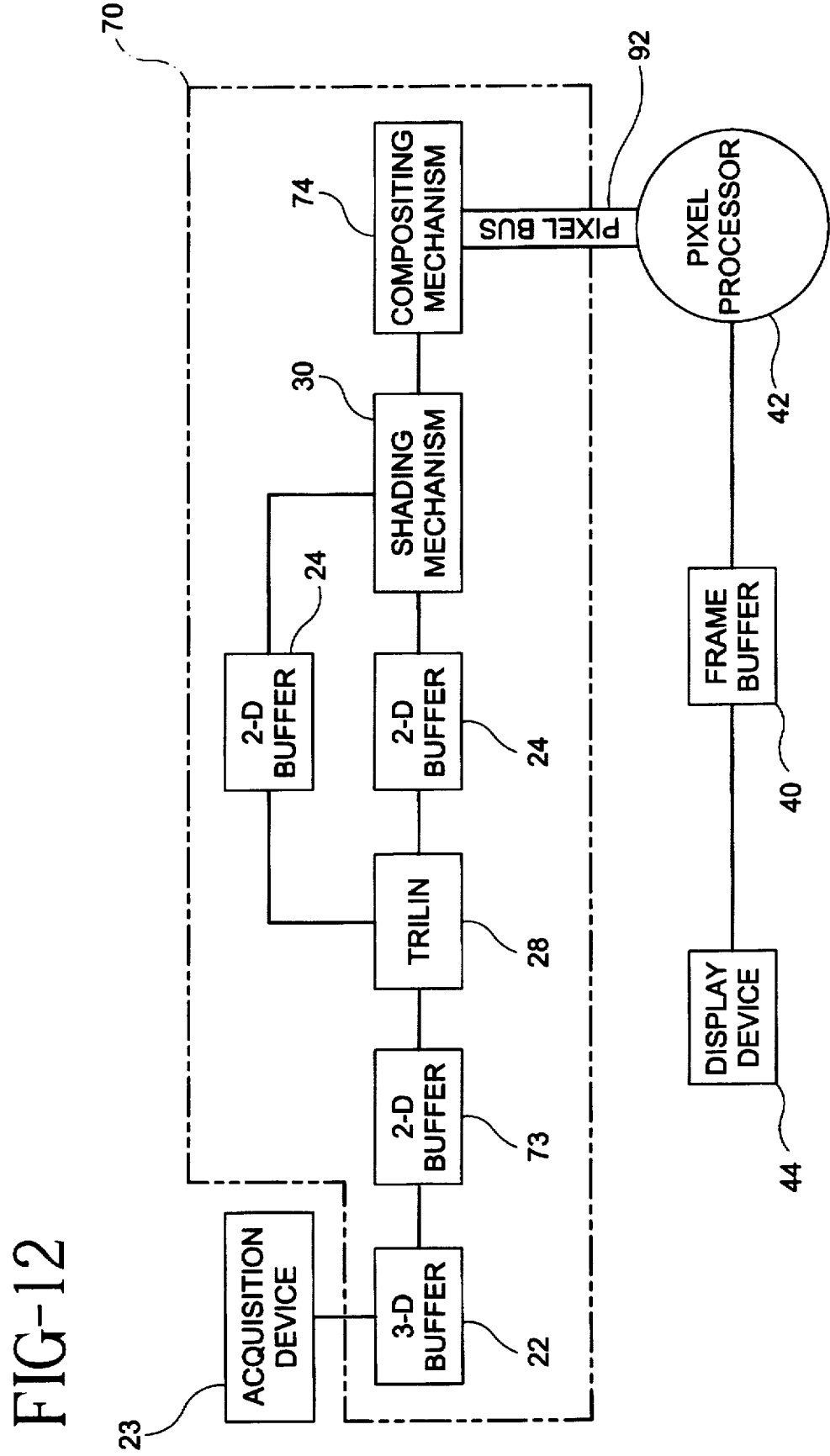
FIG. 12 is a functional block diagram of an alternative form of the apparatus for providing a 3-D volume projection of an object from a desired viewing direction constructed in accordance with the present invention.

Referring now to FIG. 12, an alternative embodiment of the present invention 70 is shown. The apparatus of the alternative embodiment of the present invention preferably includes a cubic frame buffer (CFB) 22 having a plurality of memory storage units capable of storing voxel data therein as previously described. The cubic frame buffer of the alternative form of the present invention may include a 3-D skewed memory organization enabling conflict free access of any beam of voxels 72 (i.e., a ray parallel to a main axis of the cubic frame buffer) as shown in FIG. 13. The apparatus also includes a first two-dimensional buffer 73, an interpolation mechanism (TRILIN) 28, two two-dimensional buffers 24, shading mechanism 30, and compositing mechanism 74. Coupled to the output of the compositing mechanism is a pixel processor 42, frame buffer 40, and display device 44 for generating the three-dimensional (3-D) volume projection image. The relative positioning of the pixel processor 42 and frame buffer 40 can be interchanged as required.

In an alternative form of the present invention, the method includes generating a viewing ray for each of the plurality of pixels of the display device 44. As each viewing ray traverses through the CFB, the viewing ray may change any of its x, y and z coordinates. The plurality of viewing rays define a viewing direction through the cubic frame buffer. The method further includes generating a plurality of regularly spaced sample points along each viewing ray. In order to assign a value signal to each sample point of the viewing ray, an interpolation process is employed utilizing values assigned to voxels within the CFB. Specifically, beams of voxels are retrieved from the cubic frame buffer. A beam of voxels is any discrete row, column or axle of voxels parallel to a primary axis (x, y or z) of the cubic frame buffer. In one embodiment of the invention, two n×1 slices of voxel data signals 76 which include n beams of voxels (as shown in FIG. 13) are consecutively retrieved and provided to the interpolation mechanism 28. These slices of voxel data signals can be substantially parallel to the major axis of the 3-D memory (i.e., parallel to a normal of the base plane) or substantially orthogonal to the major axis of the 3-D memory (i.e., parallel to the base plane). While two entire n×1 slices of voxel data are provided to the interpolation mechanism and utilized for each of the plurality of viewing rays as described above, for simplicity the description will be limited to one group of viewing rays.

In another embodiment of the invention, one n×1 slice of voxel data signals 76 which includes n beams of voxels (as shown in FIG. 13) are consecutively retrieved and provided to the interpolation mechanism 28. These slices of voxel data signals can be substantially parallel to the major axis of the 3-D memory (i.e., parallel to a normal of the base plane) or substantially orthogonal to the major axis of the 3-D memory (i.e., parallel to the base plane). For parallel viewing, the interpolation mechanism is a bi-linear or higher order device. Alternatively, for perspective viewing, the interpolation mechanism is a linear or higher order device which utilizes a larger neighborhood of voxels inside the n×1 slice. It is foreseen that not only one slice of voxel data could be utilized, but that a plurality of slices can be accessed to generate the interpolated sample point signals.

Referring now to FIG. 14, one embodiment of the present invention is shown. Each of the plurality of viewing rays 78 traversed through the cubic frame buffer 22 (and the corresponding sample points thereon) may be defined by two projection ray planes (PRP) within the CFB. The two PRP are commonly referred to as a top PRP 80 and a bottom PRP 82. The method of the present invention includes accessing a first beam of voxel signals 81 from the top PRP 80 and a first beam of voxel signals 83 from the bottom PRP 82. Each beam of voxels 81, 83 is provided to a "back-face" input of the interpolation mechanism as shown in FIG. 14.

Referring now to FIG. 15, the top and bottom PRP 80, 82 are shown removed from the cubic frame buffer (CFB) memory. According to the skewing scheme, voxel data having 3-D coordinates x, y and z is physically stored in memory module number $$K=(x+y+z) \bmod n \quad 0 \leq k,x,y,z \leq n-1$$

where n is the size of the cubic memory. The numbers in the planes indicate the x coordinate of a voxel that will be read from module k given certain y and z coordinates. As is evident from the figure, voxels from adjacent beams in the same PRP and voxels from adjacent beams from different PRPs have a different order of x coordinates (i.e. a skewing difference of one). In the present invention, this skewing difference between adjacent voxel beams is compensated such that appropriate voxel values of each voxel beam (i.e., voxels having the same x coordinate value) are aligned by providing a shift when voxel data signals are accessed.

As is shown in FIG. 14, the alignment of voxel data signals is preferably achieved by providing the bottom PRP 82 to the back face of the interpolation mechanism 28 without shifting the voxel data signal, and by providing the top PRP 80 to the back face of the interpolation mechanism with a shift of one unit in the negative k direction.

The method of the present invention further includes moving the first beam of voxels of the first and second voxel planes from the "back face" to a "front face" of the interpolation mechanism during the next clock cycle. In addition, a second beam of voxels from the top PRP 80 and a second beam of voxels from the bottom PRP 82 are provided to the "back face" input of the interpolation mechanism 28. Due to the skewing of data between the first voxel beam and the second voxel beam of each PRP as shown in FIG. 15, the first voxel beam of both the top and bottom PRP 80, 82 are shifted one position in the positive k direction when they are provided from the "back face" to the "front face" of the interpolation mechanism. Therefore, when the four corresponding voxel beams are present in the interpolation mechanism, the voxels of each voxel beam will be aligned so that the correct 8-voxel neighborhood is present to perform tri-linear interpolation for a sample point of each viewing ray. As a result, four voxel beams simultaneously reside in the interpolation mechanism.

The above-described shifting of voxels from the cubic frame buffer 22 to the "back-face" input of the interpolation mechanism 28 and from the "back-face" input to the "front-face" of the interpolation mechanism occurs for each clock cycle. However, if the voxel data that is stored in the cubic frame buffer is unskewed, then no shift of the voxel beams, interpolated sample point signal or shaded sample point signals is necessary.

Once the first and second voxel beams for the top and bottom PRPs 80, 82 are shifted and they are properly oriented, an interpolated sample point signal for the first sample point of each viewing ray is generated by the interpolation mechanism 28.

In a preferred embodiment of the invention, the interpolation mechanism 28 is a tri-linear interpolation mechanism (TRILIN). In order to perform a tri-linear interpolation, it is necessary to utilize eight adjacent voxels that form a cell around the sample point of the viewing ray. Alternatively, a bi-linear interpolation or higher order interpolation mechanism using voxels that are inside or outside the eight voxel neighborhood (i.e., less than or more than 8 voxel values) can be utilized.

When the viewing direction (i.e., viewing rays) has a positive or negative component in the y direction, a simple stepping scheme is employed to properly align the voxel beams in adjacent voxel planes. The stepping scheme from the cubic frame buffer to the "back-face" input of the interpolation mechanism and from the "back-face" input to the "front-face" of the interpolation is as follows:

| | Shift of Voxels in K Direction | |
|---|---|---|
| Y Step | Shift from CFB to Back-Face | Shift from Back-Face to Front-Face |
| −1 | Bottom plane → no shift | Bottom plane → no shift |
| | Top plane → −1 shift | Top plane → no shift |
| 0 | Bottom plane → no shift | Bottom plane → +1 shift |
| | Top plane → −1 shift | Top plane → +1 shift |
| +1 | Bottom plane → no shift | Bottom plane → +2 shift |
| | Top plane → −1 shift | Top plane → +2 shift |

Once the interpolated sample points are determined, the method further includes generating a gradient estimation signal for each interpolated sample point signal by providing the interpolated sample point signals to a buffer 84 for temporary storage therein. The buffer preferably includes an above buffer 86, current buffer 88 and below buffer 90. However, the method can be implemented with any two of these three buffers. The gradient estimation signal provides an indication as to surface inclination at a specific interpolated sample point. In a preferred form of the present invention, three pairs of interpolated sample point signals about a specific interpolated sample point are required to generate a gradient estimation signal. In view of the three pairs of voxels required, the actual differences in all directions (above and below, front and back, right to left) can be computed by determining central differences between selected interpolated sample points.

In order to determine the gradient difference in the major direction (i.e., along the z viewing direction), it is necessary for the shading mechanism to have access to two beams of interpolated sample points within the current buffer that are two clock cycles apart (i.e., one beam that precedes and one beam that lags the desired sample).

FIG. 14 illustrates that one group of interpolated sample points is simultaneously output by each of the above, current and below buffers 86, 88, 90 to the shading mechanism 30. However, due to the skewing of voxel data within the CFB, the interpolated sample point signals are not aligned in the above, current and below buffers as required. In order to properly align the interpolated sample point signals within the above and current buffers, the interpolated sample point signals of the current buffer are preferably shifted one position in the positive k direction within the shading mechanism 30. In order to properly align the interpolated sample point signals in the above and below buffers, the below buffer sample point signals are preferably shifted two positions in the positive k direction within the shading mechanism. In addition, the interpolated sample point signals from the above and below buffers are preferably delayed by one clock cycle so as to be aligned with the interpolated sample point signals in the current buffer. The combination of the shifts and delays compensates for the skewing difference between the interpolated sample point signals that are provided by the above, below and current buffers.

With the properly aligned interpolated sample point signals available in the shading mechanism 30, gradient differences can be accurately computed for each interpolated sample point signal every clock cycle utilizing the shading mechanism and gradient estimation method as previously described. Preferably, central differences are taken between the interpolated sample point signals on the immediate left and right, above and below as well as along the viewing ray (i.e., front and back of current sample point). The shading mechanism preferably also includes a light vector lookup table. By knowing the gradient value and the values of the light vector look-up table, an intensity of each sample point can be generated using a variety of shading methods (e.g., using an integrated Phong Shader as known in the art). As known in the art, in order to display translucency at a sample point, opacity values are generated using a transfer function represented preferably as a 2-D or 3-D lookup table or other indexing method to accessed by sample density and/or gradient value.

When the viewing direction (i.e., viewing rays) has a single positive or negative component in the y-direction, a simple stepping or shifting scheme is employed to properly align the interpolated sample value signals with adjacent groups of interpolated sample value signals in the shading unit. Specifically, a shift of interpolated sample value signals is preferred from the above, below and current buffers to the shading mechanism 30 is as follows:

| | Shift of Interpolated Samples in K Direction | |
|---|---|---|
| Y Step | Shift from ABC Buffer to Shading Mechanism | Shift Inside Shading Mechanism |
| −1 | Above plane → no shift | Above plane → −1 shift |
| | Current plane → no shift | Current plane → no shift |
| | Below plane → +2 shift | Below plane → −1 shift |
| 0 | Above plane → no shift | Above plane → no shift |
| | Current plane → no shift | Current plane → +1 shift |
| | Below plane → +2 shift | Below plane → no shift |
| +1 | Above plane → no shift | Above plane → +1 shift |
| | Current plane → no shift | Current plane → +2 shift |
| | Below plane → +2 shift | Below plane → +1 shift |

Once the gradient estimation values are computed for each interpolated sample point of the current buffer, each of the interpolated sample point signals including a shading component is provided to a compositing mechanism 74 which performs composition operations of sample points along respective viewing rays. Since the beams of shaded sample value signals that are output by the shading mechanism are still skewed, the composition of a single orthogonal ray cannot be done by a single compositing unit. Specifically, in a preferred embodiment of the invention, each interpolated sample point of the viewing ray is composited in a different compositing mechanism. Since two consecutive voxel beams have a skewing difference therebetween, the compositing results for each consecutive composited ray have to be provided with a unit step in the positive k direction for each consecutive composition step as shown in FIG. 14. For any viewing ray having a steps in x and/or y (positive, negative or none), a shift of shaded sample value signals from the shading mechanism to the compositing mechanism is as follows:

| Shift of Gradient Sample Values in K Direction | | | | |
|---|---|---|---|---|
| Y | X | Negative | None | Positive |
| Negative | | −1 | 0 | 1 |
| None | | 0 | 1 | 2 |
| Positive | | 1 | 2 | 3 |

The composition of interpolated sample points performed within the composition mechanism occurs in substantially the same method as previously explained. Specifically, the composition mechanism could combine the interpolated voxel values with either back-to-front compositing, front-to-back compositing, first opaque projection, weighted sum projection, last-to-first cut projection or first-to-last cut projection or any other known composition technique.

Once the interpolated sample points are composited, they are provided, for example, to a general purpose host computer or a pixel processor 42, where post processing, such as post-shading, splatting, and 2-D transformation or warping, is preformed. Pixel processing for display on the display device 44 preferably occurs as previously explained.

In an alternative form of the present invention, one slice of voxel data signals are accessed from the 3-D memory. Each slice of voxel data signals is substantially parallel to the base plane of the 3-D memory. The slice of voxel data consists of a plurality of voxel data beams that are provided to the interpolation mechanism. In this embodiment, the interpolation mechanism has only one face (either a back face or a front face). The interpolation mechanism is a bi-linear or higher order device for parallel viewing wherein the interpolation utilizes voxels from one slice. For perspective viewing, the interpolation mechanism is a linear or higher order device which utilizes a larger neighborhood of voxels from the one slice. The interpolated voxel value signals are thereafter provided to the above, below and current buffers 86, 88, 90 as previously described.

The above described method can support both parallel and perspective viewing of objects stored in the 3-D memory. For perspective viewing, since the viewing rays are substantially divergent (i.e., not parallel), the slices of voxel data signals accessed for any one viewing ray may not be utilized for determining the interpolated sample valve signal for any other viewing ray. Therefore, each viewing ray requires access of individual voxel planes. This is also required for the shading mechanism and compositing mechanism.

Figure 16:
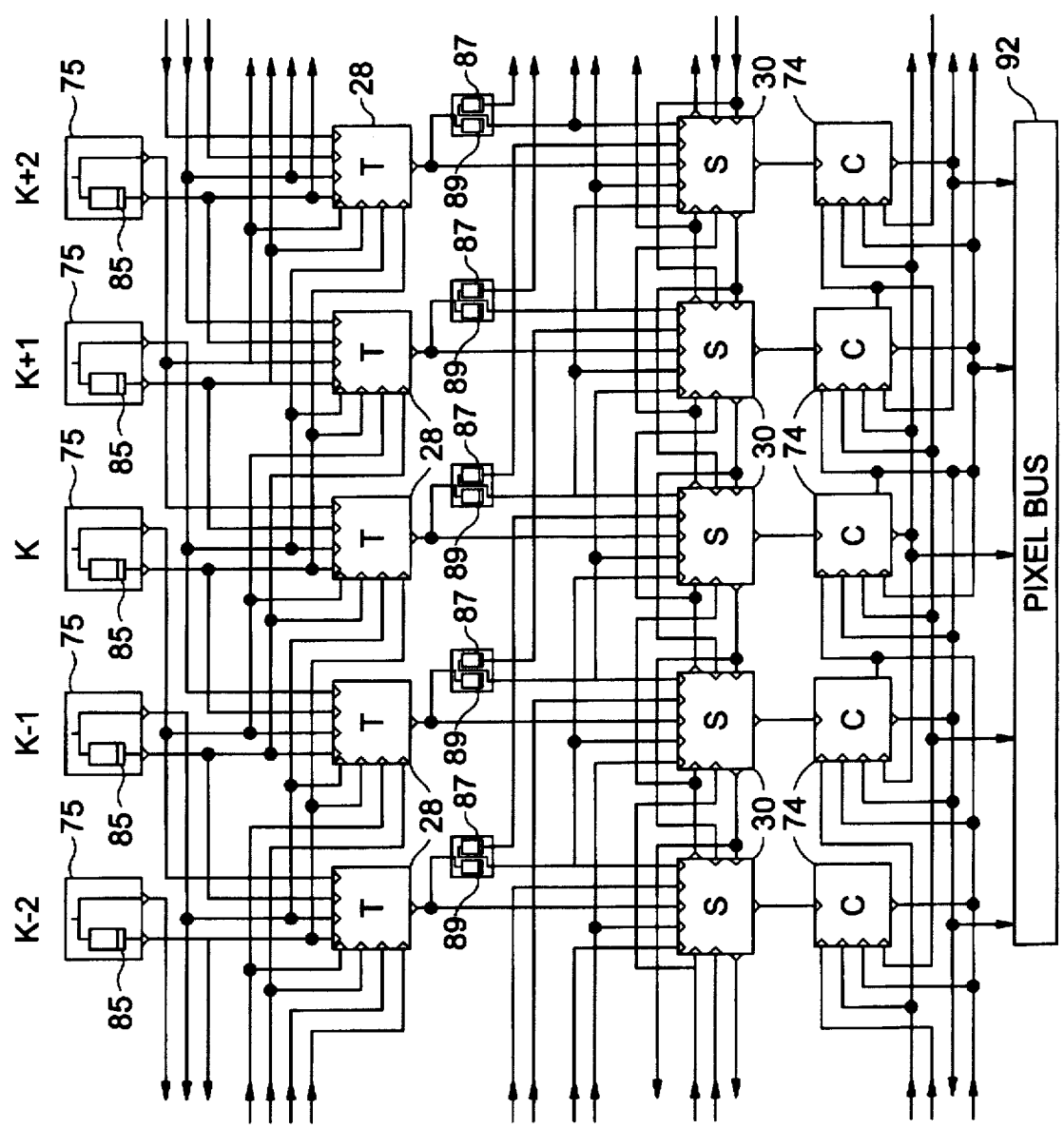
FIG. 16 is a functional block diagram of the apparatus for providing a 3-D volume projection of an object in accordance with the present invention.

Referring now to FIG. 16, a more detailed drawing of the interconnections of embodiment of the apparatus is shown. FIG. 16 shows the implementation of five memory units 75 of the CFB 22 including a first in-first out buffer (FIFO buffer) 85. Each of the five memory units 75 are unable to output two beams simultaneously but by including the FIFO buffer, one slice of memory is provided for one of the PRPs. The apparatus also includes five interpolation mechanisms (TRILIN) 28 that are coupled to the FIFO buffers and memory units in accordance with the shifting requirements between the cubic frame buffer and the interpolation mechanisms as previously described. The five interpolation mechanism 28 are coupled to five shading mechanisms 30 utilizing direct connections for one of the above, below and current planes, and two FIFO buffers 87, 89 for the two remaining above, below and current planes. The shading mechanisms 30 are interconnected among proximate shading mechanism in accordance with the shifting requirements between the TRILIN and the shading mechanism as previously described. The apparatus also includes five compositing units 74 that are preferably directly coupled to a respective shading mechanism for receiving an output signal from each shading mechanism. Each compositing unit perform a projection method as previously described. The interconnection of each component is evident based upon the above requirements of data shifts by and between each component of the apparatus. The output signals provided by the compositing mechanism are output to a pixel bus 92 that forwards the compositing mechanism output signals to the pixel processor 42, frame buffer 40 and display device 44 to generate the volumetric image.

The alternative embodiment of the present invention is advantageous because it is a novel ray-casting method and apparatus that leads to a uniform mapping of sample points along viewing rays onto voxels that avoids multiple access of voxel data for the interpolation mechanism and shading mechanism. The method and apparatus of the present invention access each voxel inside the cubic frame buffer (CFB) only once per projection. This permits regular memory access patterns leading to high efficiency and enabling real-time performance rates needed for visualization of dynamically changing 3D data sets.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed:

1. A method for generating a three-dimensional (3-D) volume projection image having a plurality of pixels, the method utilizing discrete voxels stored in a 3-D memory, each voxel having at least one voxel signal associated therewith, the method comprising:

a) selecting viewing parameters to access voxels stored in the 3-D memory, the viewing parameters defining a viewing direction, the viewing direction defining a base plane of the 3-D memory and a plurality of continuous viewing rays;

b) consecutively accessing a plurality of adjacent discrete voxel beams, each of the plurality of discrete voxel beams being substantially parallel to the base plane of the 3-D memory, said discrete voxel beams being skewed relative to each other;

c) simultaneously generating a first continuous sample point for each of the plurality of continuous viewing rays in a parallel fashion;

d) simultaneously determining, in a parallel fashion, an interpolated sample point value signal for each first continuous sample point of the plurality of viewing rays by interpolating among signals associated with the voxels of at least two discrete voxel beams proximate to a corresponding one of the first continuous sample points, voxel signals associated with a first of said discrete voxel beams proximate said corresponding one of said first continuous sample points being skewed relative to voxel signals associated with a second of said discrete voxel beams proximate said corresponding one of said first continuous sample points;

e) simultaneously generating a second continuous sample point for each of the plurality of continuous viewing rays in a parallel fashion;

f) simultaneously determining, in a parallel fashion, an interpolated sample point value signal for each second continuous sample point of the plurality of viewing rays by interpolating among signals associated with the voxels of at least two discrete voxel beams proximate to a corresponding one of the second continuous sample points, voxel signals associated with a first of said discrete voxel beams proximate said corresponding one of said second continuous sample points being skewed relative to voxel signals associated with a second of said discrete voxel beams proximate said corresponding one of said second continuous sample points;

g) maintaining a skewed organization of said interpolated sample point value signals for each of said first and second continuous sample points in a temporary storage buffer having at least two of an above, current and below plane;

h) shifting said interpolated sample point value signals within a shading mechanism;

i) performing a gradient estimation function for each of said interpolated sample point value signals within said shading mechanism in order to provide output beams of skewed shaded sample point value signals including the first and second sample point interpolated sample point value signals;

j) combining the beams of skewed, shaded sample point value signals including the first and second sample point interpolated sample point value signals, for each of the plurality of viewing rays, to generate a pixel signal associated with a corresponding pixel of the 3-D volume projection image, the pixel signal defining characteristics of a corresponding pixel, the beams of skewed, shaded sample point value signals being combined in a plurality of compositing units, each sample point value signal for a given one of said plurality of continuous viewing rays being composited in a different compositing unit in accordance with said beams of skewed, shaded sample point value signals which are output by said shading mechanism;

k) unskewing said pixels in a pixel bus; and l) displaying the pixel associated with each of the plurality of viewing rays in accordance with the pixel signal.

2. A method for generating a three-dimensional (3-D) volume projection image as defined by claim 1, wherein at least one of steps (d) and (f) further comprise:

a) performing a linear interpolation between at least first and second voxel signals of each of a first, second, third and fourth discrete voxel beams to provide first, second, third and fourth linearly interpolated sample signals;

b) performing a linear interpolation between the first and second linearly interpolated sample signals to provide a first bi-linearly interpolated sample signal;

c) performing a linear interpolation between the third and fourth linearly interpolated sample signals to provide a second bi-linearly interpolated sample signal;

d) performing a linear interpolation between the first bi-linear interpolated sample signal and the second bi-linearly interpolated sample signal to provide one of the first and second sample point interpolated sample point value signals.

3. A method for generating a three-dimensional (3-D) volume projection image as defined by claim 1, wherein at least one of steps (d) and (f) further comprise:

a) performing a linear interpolation between at least first and second voxel signals of each of said discrete voxel beams to provide first and second linearly interpolated sample signals; and b) performing a linear interpolation between the first and second linearly interpolated sample signals to provide a bi-linearly interpolated sample signal.

4. A method for generating a three-dimensional (3-D) volume projection image as defined by claim 1, wherein step (j) further comprises:

performing at least one of back-to-front compositing, front-to-back compositing, first opaque projection utilizing a transfer function, last opaque projection utilizing a transfer function, maximum value projection, weighted sum projection, first-to-last cut projection and last-to-first cut projection of the interpolated sample point value signals.

5. A method for generating a three-dimensional (3-D) volume projection image as defined by claim 1, wherein step (j) includes:

transforming the pixel signal in accordance with the selected viewing parameters to provide a transformed pixel signal.

6. A method for generating a three-dimensional (3-D) volume projection image as defined by claim 1, the method further comprising:

one of scanning and computing one of an object, region and phenomenon and generating voxels in response thereto, the voxels being provided to a memory storage device for storage therein.

7. The method of claim 1, wherein:

21 step (b) includes accessing said plurality of adjacent discrete voxel beams as projection ray planes of said voxel signals;

in step (d), said voxel signals associated with said first of said discrete voxel beams are also associated with a first of said projection ray planes and said voxel signals associated with said second of said discrete voxel beams are also associated with a second of said projection ray planes; and in step (f), said voxel signals associated with said first of said discrete voxel beams are also associated with said first of said projection ray planes and said voxel signals associated with said second of said discrete voxel beams are also associated with said second of said projection ray planes.

8. The method of claim 1, wherein in step (b), said discrete voxel beams are accessed as slices of voxel data signals.

9. An apparatus for generating a three-dimensional (3-D) volume projection image in response to predetermined viewing parameters, the apparatus comprising:

a) a three-dimensional memory for storing a plurality of discrete voxels, the predetermined viewing parameters defining a viewing direction within said three-dimensional memory, said viewing direction defining a base plane of said three-dimensional memory and a plurality of continuous viewing rays, said three-dimensional memory including a plurality of memory units, each of said plurality of memory units having a memory unit buffer;

b) a plurality of interpolation mechanisms coupled to said plurality of memory units of said three-dimensional memory, the plurality of interpolation mechanisms receiving voxel signals from said plurality of memory units, the voxel signals corresponding to at least two adjacent discrete voxel beams, said voxel beams being substantially parallel to said base plane of said three-dimensional memory, the plurality of interpolation mechanisms providing at least first and second interpolated sample point value signals for at least first and second corresponding continuous sample points of each of said plurality of continuous viewing rays, each of said first continuous sample points being generated simultaneously in parallel, each of said first interpolated sample point value signals being determined simultaneously in parallel, each of said second continuous sample points being generated simultaneously in parallel, each of said second interpolated sample point value signals being determined simultaneously in parallel, each of said plurality of interpolation mechanisms receiving both voxel signals corresponding to the first of said discrete voxel beams directly from said plurality of memory units and voxel signals corresponding to the second of said discrete voxel beams from said memory unit buffers of said plurality of memory units, each of said plurality of interpolation mechanisms having at least one interpolation unit buffer;

c) a plurality of shading mechanisms, said plurality of shading mechanisms being coupled to said plurality of interpolation mechanisms for receiving said at least first and second interpolated sample point value signals for each of said plurality of continuous viewing rays, sample point value signals associated with one of an above, current and below plane being received by said plurality of shading mechanisms directly from said

22 plurality of interpolation mechanisms, sample point value signals associated with another of said above, current and below planes being received by said plurality of shading mechanisms from said at least one interpolation unit buffer of said plurality of interpolation mechanisms;

d) a plurality of compositing units, the plurality of compositing units being coupled to the plurality of shading mechanisms, the plurality of compositing units combining said at least first and second interpolated sample point value signals to provide a pixel value signal for each of the plurality of continuous viewing rays; and e) a pixel bus which is coupled to said plurality of compositing units; wherein each of said pluralities of memory units, interpolation mechanisms, shading mechanisms and compositing units communicates with at most two nearest neighbors and two next-nearest neighbors, with global communication being provided by said pixel bus.

10. The apparatus for generating a three-dimensional (3-D) volume projection image as defined by claim 9, the plurality of interpolation mechanisms each comprising:

one of a linear, bi-linear, tri-linear and higher order interpolation device (TRILIN), the TRILIN generating said at least first and second continuous sample points of each of said plurality of continuous viewing rays, the TRILIN receiving said at least two discrete voxel beams, the TRILIN utilizing a voxel from each of said at least two discrete voxel beams to determine said interpolated sample point value signals for each of the at least first and second continuous sample points.

11. The apparatus for generating a three-dimensional (3-D) volume projection image as defined by claim 9, wherein each of said compositing units includes:

at least one of a front-to-back compositing mechanism, a back-to-front compositing mechanism, a first opaque projection mechanism utilizing a transfer function, a last opaque projection mechanism utilizing a transfer function, a maximum value projection mechanism, a weighted sum projection mechanism, a last-to-first cut projection mechanism and a first-to-last cut projection mechanism for generating the pixel value signal for each of the plurality of continuous rays.

12. Apparatus for generating a three-dimensional (3-D) volume projection image as defined by claim 9, the apparatus further comprising:

a frame buffer receiving the plurality of pixel value signals and storing the pixel value signals therein.

13. Apparatus for generating a three-dimensional (3-D) volume projection image as defined by claim 12, the apparatus further comprising:

a pixel processing mechanism, the pixel processing mechanism being coupled to the frame buffer and receiving the plurality of pixel value signals, the pixel processing mechanism modifying each of the plurality of pixel signals and generating a plurality of pixel display signals.

14. Apparatus for generating a three-dimensional (3-D) volume projection image as defined by claim 13, the apparatus further comprising:

a display mechanism coupled to the pixel processing mechanism, the display mechanism having a plurality of pixels, the display mechanism receiving the plurality of the pixel display signals from the pixel processing mechanism, each of the plurality of pixel display signals corresponding to one of a plurality of pixels of the display mechanism, the display mechanism providing a 3-D volume projection image.

15. Apparatus for generating a three-dimensional (3-D) volume projection image as defined by claim 9, the apparatus further comprising:

a data acquisition mechanism, the data acquisition mechanism performing one of scanning and computing of one of an object, region and phenomenon and generating voxels in response thereto.

16. The apparatus of claim 9, wherein:

said two adjacent discrete voxel beams are accessed as first and second projection ray planes of said voxel signals in a beam parallel fashion; and said plurality of interpolation mechanisms each have front and back faces, said back faces receiving said voxel signals from said memory units, said front faces interfacing with said plurality of shading mechanisms, said voxel beams of said projection ray planes being shifted as they are provided from said back faces to said front faces.

17. The apparatus of claim 16, wherein:

each of said plurality of interpolation mechanisms further comprises at least a second interpolation unit buffer; and each of said plurality of shading mechanisms receives sample point value signals associated with yet another of said above, current and below planes from said at least second interpolation unit buffer of said plurality of interpolation mechanisms.

18. The apparatus of claim 9, wherein:

said two adjacent discrete voxel beams are accessed as slices of said voxel signals in a slice-parallel fashion; and said plurality of interpolation mechanisms each have one of a front and a back face which receives one of said slices of said voxel signals.

19. The apparatus of claim 18, wherein:

each of said plurality of shading mechanisms further comprises at least a second interpolation unit buffer; and each of said plurality of shading mechanisms receives sample point value signals associated with yet another of said above, current and below planes from said at least second interpolation unit buffer of said plurality of interpolation mechanisms.

* * * * *